July 28, 1953    H. D. HARTOUGH ET AL    2,647,117
PREPARATION OF NITROGEN-CONTAINING MATERIALS FROM OLEFINS
Filed Nov. 29, 1949    3 Sheets—Sheet 3
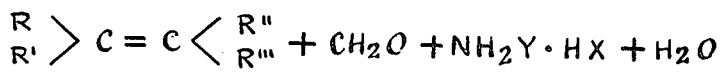
*Fig. III*
WHEN Y = OH
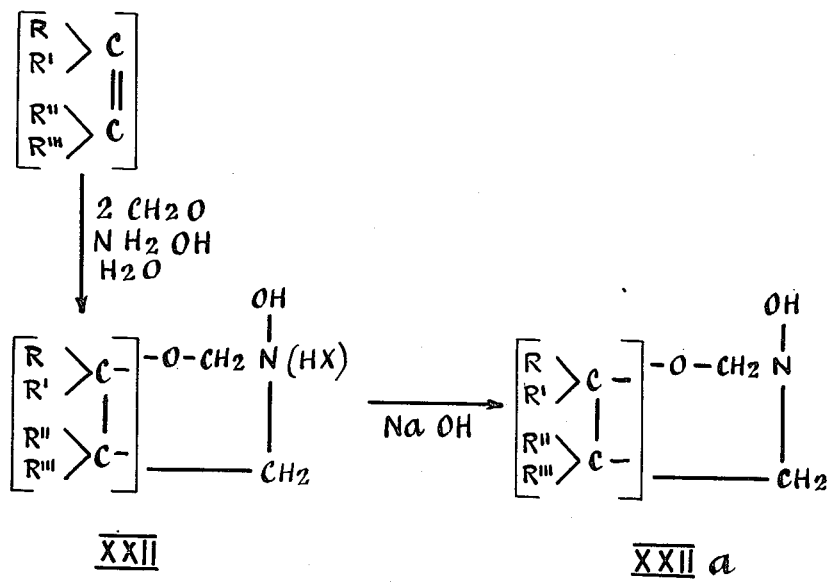
INVENTORS
HOWARD D. HARTOUGH
JOSEPH J. DICKERT, JR.
BY SEYMOUR L. MEISEL
*Francis Johnston*
AGENT OR ATTORNEY Patented July 28, 1953

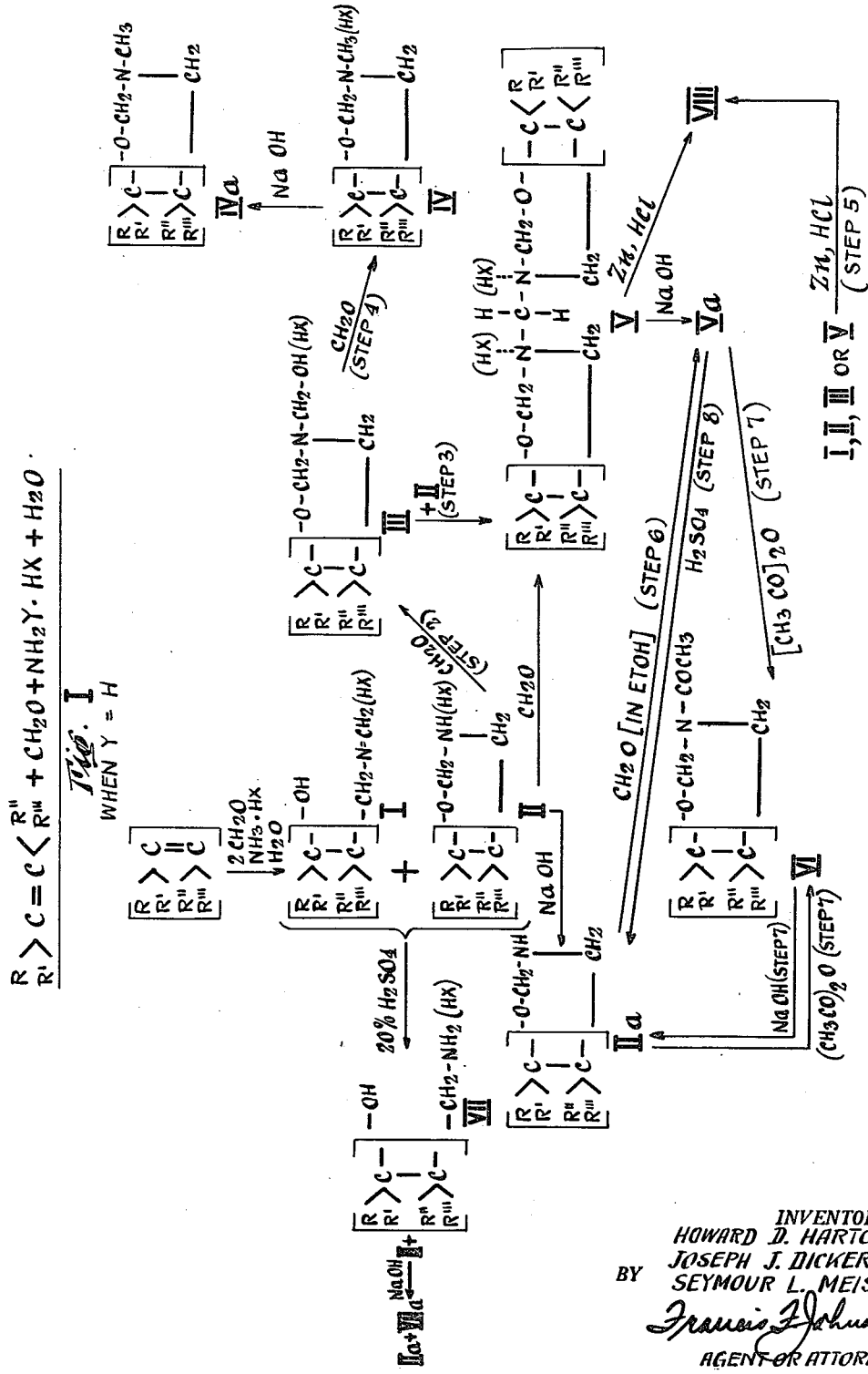

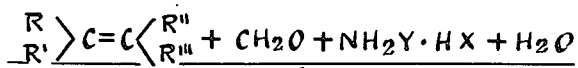
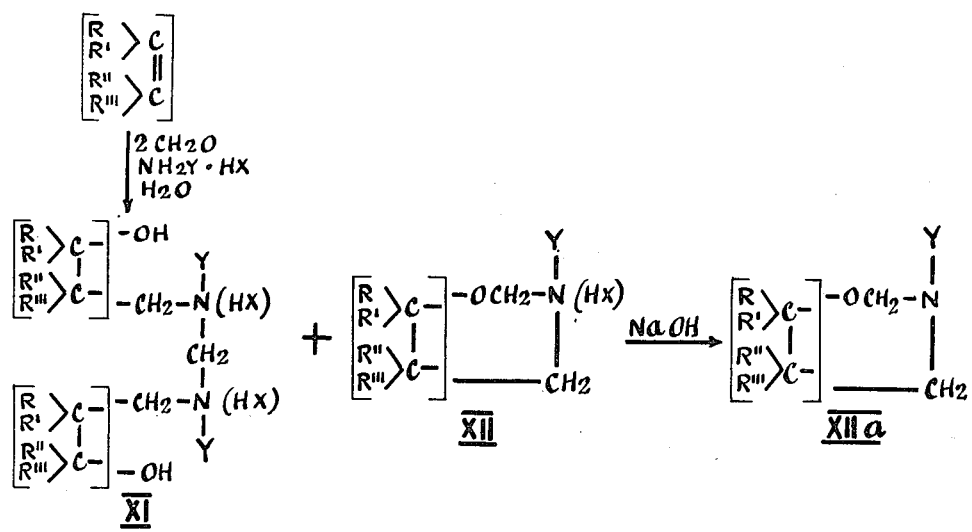
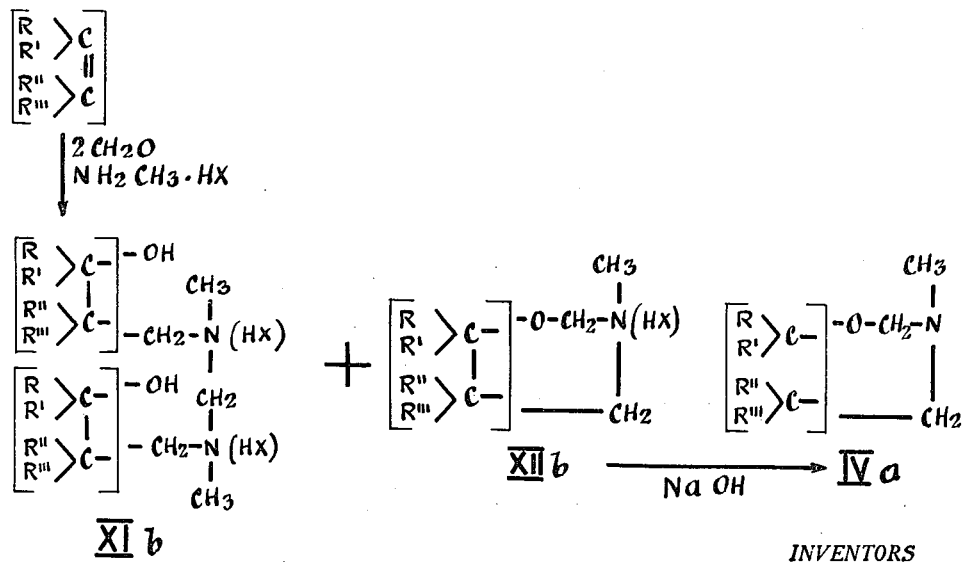

2,647,117

UNITED STATES PATENT OFFICE 2,647,117

PREPARATION OF NITROGEN-CONTAINING MATERIALS FROM OLEFINS

Howard D. Hartough, Pitman, Joseph J. Dickert, Jr., Westville, and Seymour L. Meisel, West Deptford Township, Gloucester County, N. J., assignors to Socony-Vacuum Oil Company, Incorporated, a corporation of New York Application November 29, 1949, Serial No. 129,948

14 Claims. (Cl. 260—246)

The present invention relates to the reaction between olefinic compounds, formaldehyde and halides of ammonia, primary amines and primary diamines.

The art has known for some time that a reaction generally known as the Mannich reaction takes place when ammonia or a primary or secondary amine, usually as the hydrochloride, condenses with formaldehyde and a compound containing at least one hydrogen atom of pronounced reactivity. It is said that the essential feature of the reaction is the replacement of the active hydrogen by an aminomethyl or substituted aminomethyl group. As an illustration of the mechanism of the reaction, reference is made to the reaction between acetophenone, formaldehyde, and a secondary amine salt. This reaction is believed to follow a course illustrated by the following equation in which the reactive hydrogen atoms are underlined.

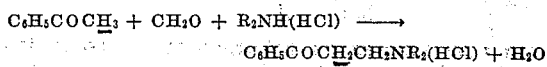

The compounds which participate in the Mannich reaction when secondary amines are used are ketones, aldehydes, certain acids and esters, such as malonic acid and its esters, phenols, acetylenes, alpha-picolines and quinaldines. When primary amines are used they may be condensed with the classes of compounds enumerated hereinbefore. When ammonia is the source of the amine group of the product, however, only ketones and acids have been found to condense therewith.

It has now been discovered that olefinic compounds can be condensed with hydrohalides of ammonia, primary amines and primary diamines to produce formaldimines, oxazines and bis-methanes. The amine products so obtained have many industrial application among which is that of emulsifiers.

It is an object of the present invention to provide a means for producing formaldimines, tetrahydro-oxazines, and bis-(tetrahydro-1,3-oxazino)-alkanes from olefinic compounds.

It is a further object of the present invention to provide novel tetrahydro-oxazines, formaldimines and bis(tetrahydro-1,3-oxazino)-methanes.

Other objects and advantages will become apparent from the following discussion taken in conjunction with the drawings which are a graphical representation of the postulated reaction mechanism and the amino products produced.

In general, the present invention provides a means for reacting an olefinic compound having a composition corresponding to the formula

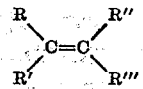

an aldehyde, and a hydrohalide of ammonia or a primary amine (alkyl, cycloalkyl or aryl) or a primary diamine to produce tetrahydro-oxazines, formaldimines, and bis-(tetrahydro-1,3-oxazino)-alkanes. In the formula

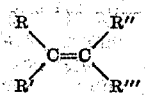

R is hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, and a heterocyclic group; R' is R, hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, and a heterocyclic group; R'' is R, R', hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, and a heterocyclic group; and R''' is R, R', R'', hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, and a heterocyclic group. Furthermore, when any of R, R', R'' and R''' is other than H or $CH_3$, it may be substituted with such groups as $NO_2$, CN, X, COOH, etc. (X=Cl, Br or I). These substituents preferably are removed by at least 2 carbon atoms from the olefinic moiety. However, there are two limitations, to wit: no more than three and preferably, only two, of R, R', R'' and R''' may be substituents other than hydrogen and when one of the pair of substituents, R, R' or R'', R''' is hydrogen and the other substituents, R'' and R''' or R and R' are hydrogen, then the other member of the pair shall be a substituent having a double bond in conjugation with the double bond of the parent olefin. Thus, for example, when R or R' is hydrogen and R'' and R''' are hydrogen, the other substituent shall be a substituent having a double bond in conjugation with the double bond in the parent olefin. Similarly, when R'' or R''' is hydrogen and R and R' are hydrogen, the other substituent shall be one having a double bond in conjugation with the double bond of the parent olefin. Thus, for example, styrene participates in this reaction having a composition corresponding to

when R is hydrogen, R' is phenyl, R'' is hydrogen and R''' is hydrogen. Δ9,11-linoleic acid is also included since it has a composition corresponding to

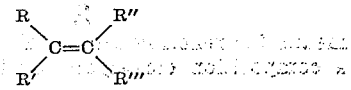

when R and R'' are hydrogen, R' is

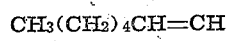

$CH_3(CH_2)_4CH=CH$ and R''' is $(CH_2)_7COOH$ or

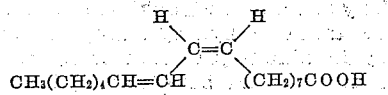

Eleostearic acid, Δ9,11,13-octadecatrienoic acid, and similar carboxylic acids having two or more conjugated double bonds participate in this reaction. Examples of other carboxylic acids which can participate in this novel reaction are methacrylic acid, isocrotonic acid and the like. In other words, when neither of the substituents attached to a single double bond carbon atom is hydrogen, it is not necessary that a double bond be in conjugation with the double bond of the parent olefin. Thus, acrylic acid is not included in the group of operative carboxylic acids because three of the substituents are hydrogen and the fourth substituent does not have an olefinic or aromatic double bond in conjugation with the double bond of the parent olefin—as is manifest upon inspection of the structural formula of acrylic acid.

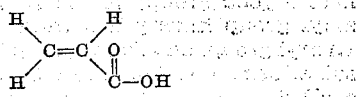

Another group of compounds which participate in this reaction are the vinyl sulfones, vinyl ethers, vinyl thioethers and vinyl halides.

In general, the products are substituted tetrahydro-1,3-oxazines. The products can be mono-, di-, tri-, or tetra-substituted since one or both of the hydrogens attached to the carbon atoms of the oxazine ring derived from the olefinic reactant may be substituted by alkyl, aryl, alkaryl, aralkyl, cycloalkyl or heterocyclic substituents as emphasized hereinbefore.

It is to be noted that the oxazines were first recognized about 50 years ago when Knorr obtained tetrahydro-1,4-oxazine by heating diethanolamine with hydrochloric acid at 160° C. Morpholine, the common name for tetrahydro-1,4-oxazine, can also be made by the action of sulfuric acid on triethanolamine. (Morton, "The Chemistry of Heterocyclic Compounds" (1946), 477.) The difference between the classical reaction to produce morpholine, tetrahydro-1,4-oxazine, and the postulated reaction of the present invention whereby substituted tetrahydro-1,3-oxazines are produced is readily recognized upon inspection of the following equations:

Knorr's classical reaction:

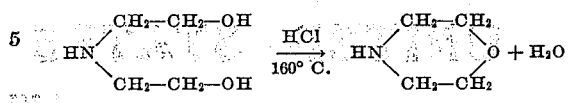

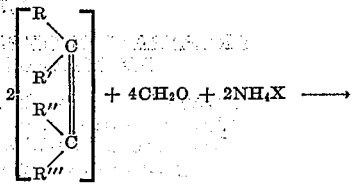

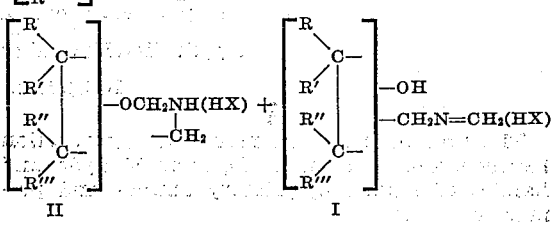

Substituted tetrahydro-1,3-oxazine hydrohalide    Gamma-hydroxyalkyl-formaldimine hydrohalide In the presence of excess formaldehyde, II is converted to N-methyloltetrahydro-1,3-oxazine which in turn is converted by more formaldehyde to N-methyltetrahydro-1,3-oxazine and the bis-(tetrahydro-1,3-oxazino)-methane.

In addition to the foregoing amines, m-dioxanes of the general structure

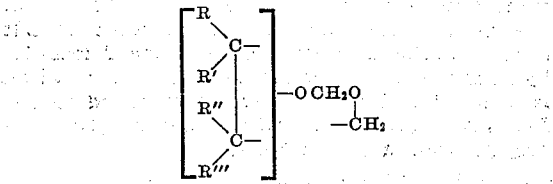

are also formed as by-products, in some instances in trace amounts but generally to the extent of about 5 per cent of the total products.

It is to be noted that Kohn reported in Monatshefte, 25, 827, 833, 851 (1904) the preparation of the 4,4,6-trimethyl-tetrahydro-1,3-oxazine as a result of the reaction between 1,1-dimethyl-1-amino-3-hydroxybutane and aqueous formaldehyde. This reaction can be represented by the equation:

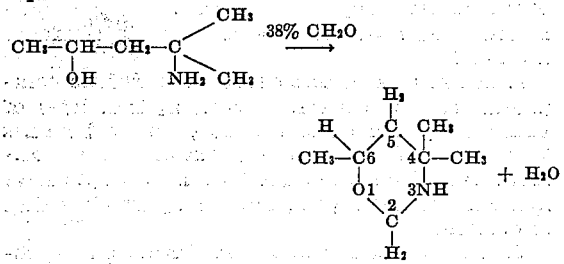

Manifestly Kohn's reaction is different from the postulated mechanism of the present method in that it involves solely a ring closure of a hydroxylated alkyl amine whereas the present method involves an olefinic compound, formaldehyde and ammonium hydrohalide or a primary amine hydrohalide. It will also be noted that Kohn's tetrahydro-1,3-oxazines are substituted at the 4 and 6 positions whereas the products of the present method of preparation are substituted at the 4, 5 or 6 positions of the tetrahydrooxazine ring.

In general, it has been found that olefinic compounds having a composition corresponding to the formula

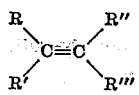

wherein R, R', R" and R'" have the significance given hereinbefore react with a hydrohalide of ammonia or a primary amine or a primary diamine to produce formaldimines, tetrahydro-1,3 - oxazines, a bis - (tetrahydro -1,3 - oxazino)- alkanes. Thus, referring to the drawing, when an olefinic compound is reacted in the molal proportion of 1:2:1 with formaldehyde (aqueous 36–38 per cent or paraformaldehyde sometimes designated trioxymethylene or in the form of trioxane) and a hydrohalide of ammonia at temperatures of about 0° C. to about 80° C., the first products are a gamma-hydroxy-alkyl-formaldimine (I) and a tetrahydro-1,3-oxazine (II) as indicated in the drawing. When a hydrohalide of a primary amine is used rather than a hydrohalide of ammonia the product is an N-alkyl-tetrahydro-1,3-oxazine (Fig. II). Consequently, the first step illustrated in the drawing (Fig. I), can be further amplified by the equation:

(1)

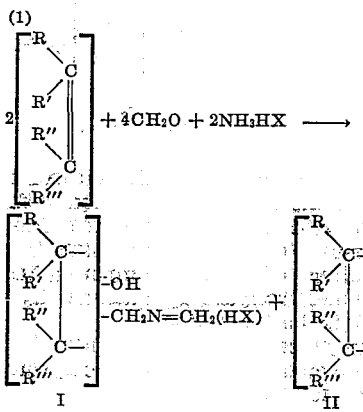

Similarly, the first step illustrated in Fig. II can be amplified by the equation where Y is an alkyl group having not more than 18 carbon atoms, an aryl group or a cycloalkyl group.

(2)

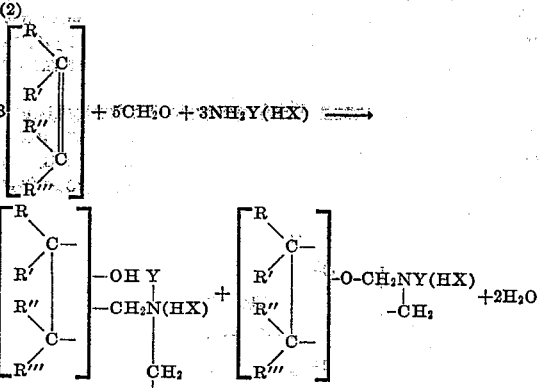

(where Y is the alkyl, cycloalkyl or aryl group of the primary amine hydrohalide).

In the special case when Y=CH₃ Compound IV is obtained (Fig. IIa).

The first step illustrated in Fig. III can be amplified by the equation (3)

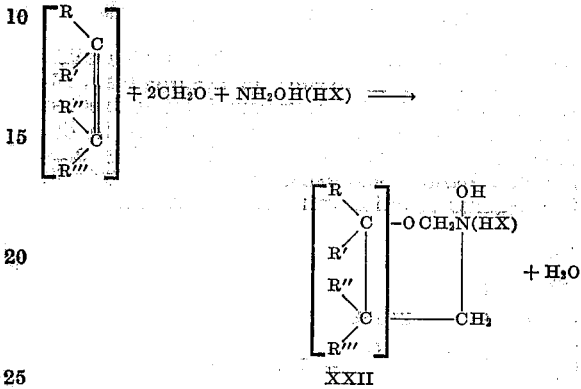

N-hydroxy-tetrahydro-1,3-oxazine hydrohalide

When Compound IV (Fig. I), XII (Fig. II), XIIb (Fig. IIa) or XXII (Fig. III) is treated with strong caustic such as sodium or potassium hydroxide, the free amines, IVa, XIIa, IVa and XXIIa respectively are set free as indicated in the following equation:

(4)

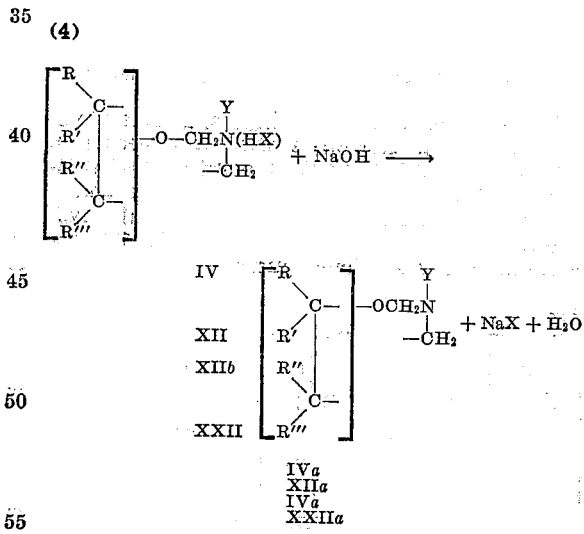

When Compound II, the tetrahydro-1,3-oxazine hydrohalide is treated with a further amount of formaldehyde and when a material excess of the molal proportion of formaldehyde set forth hereinbefore is present in the original reaction mixture, the N-methylol-tetrahydro-1,3-oxazine hydrohalide (III) is formed as represented by the reaction (5)

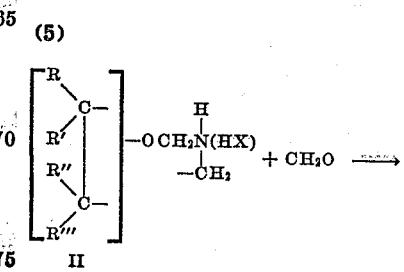

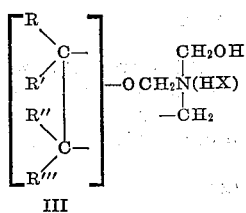

III
N-methylol-tetrahydro-1,3-oxazine hydrohalide

N-methyl-tetrahydro-1,3-oxazine hydrohalide (Compound IV) is formed in accordance with Equation 6 when (1) Compound III is treated with a further amount of formaldehyde in the molal ratio of 1:1 and (2) (when using ammonium halide) the excess of formaldehyde in the original reaction mixture is sufficient.

(6)
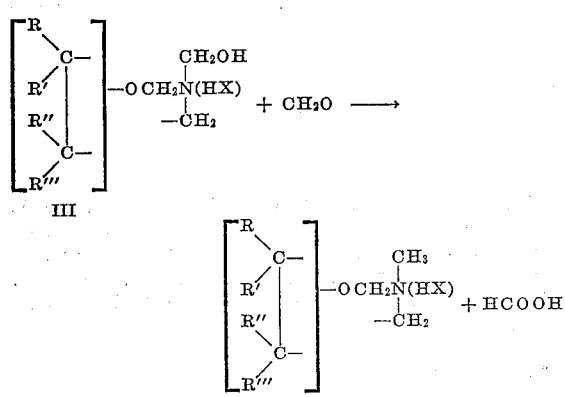

N-methyl-tetrahydro 1,3-oxazine hydrohalide

When conditions are conducive, a molecule of Compound IIa condenses with a molecule of Compound IIIa to form Compound V, bis-(tetrahydro-1,3-oxazino)-methane. The same end is attained when compound IIa and formaldehyde are reacted in the molal proportion of 2:1 in accordance with Equations 7 and 8.

(7)
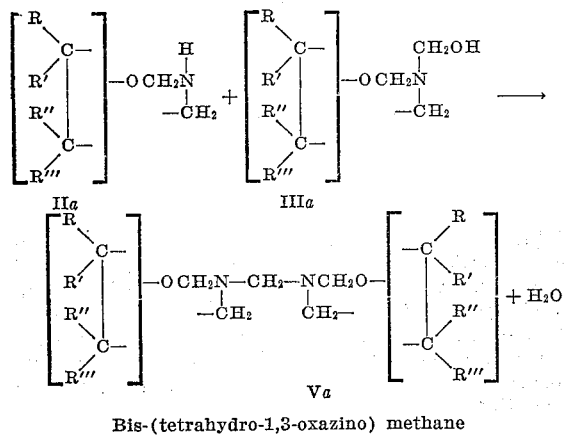

Bis-(tetrahydro-1,3-oxazino) methane (8)
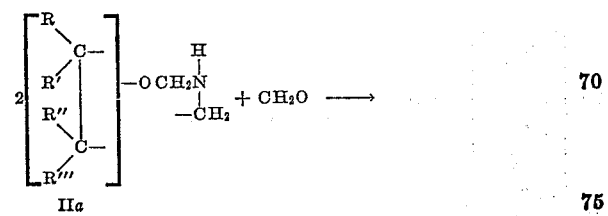

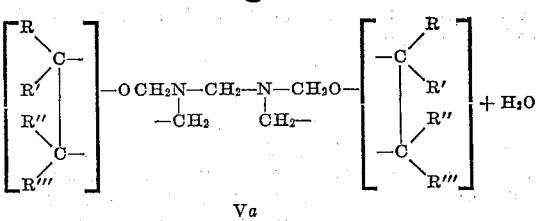
Va

However, the corresponding bis-alkanes are obtained directly when primary diamines such as ethylenediamine, propylenediamine, butylenediamine and the like are reacted in the form of dihydrohalides with an olefinic compound and formaldehyde in accordance with the following equation:

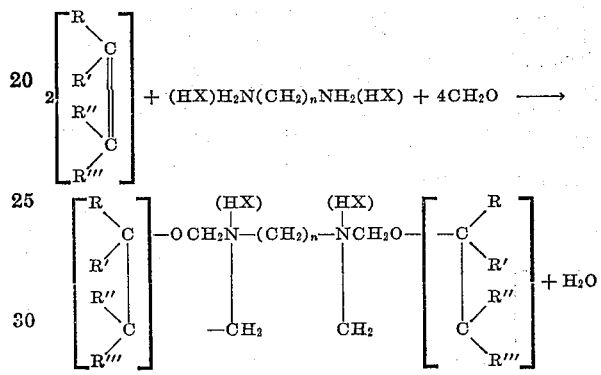

where $n$ is greater than 1.

In the following discussion as in the drawings the hydrohalide of the amine is numbered with Roman numerals and the corresponding free amine by the same Roman numeral with the addition of the letter "$a$." Thus, Compound III is the N-methylol-tetrahydro-1,3-oxazine hydrohalide and IIIa is the free amine.

In general, the present method provides for reacting an olefinic compound having a composition corresponding to the formula

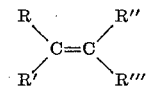

wherein R, R', R'' and R''' represent the substituents enumerated hereinbefore, with formaldehyde; i. e., either an aqueous solution thereof or in the reversible polymeric form and a hydrohalide of ammonia, hydroxylamine, a primary amine, or a primary diamine.

It is to be noted that gamma-hydroxyalkyl-formaldimines are only formed when an ammonium halide is used. When a primary amine halide is used N, N'-bis-methanes corresponding to the formula

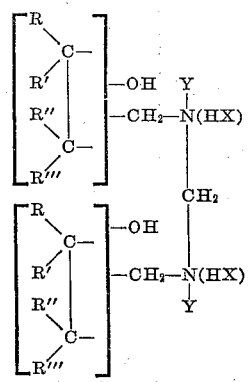

where Y is alkyl having not more than 18 carbon atoms, cycloalkyl or aryl and R, R', R'' and R''' have the significance indicated hereinbefore, are obtained. Causticization of the reaction mixture sets free the amine.

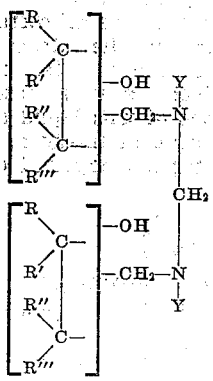

In addition the N-substituted mono or di-substituted tetrahydro-1,3-oxazine is formed.

On the other hand when hydroxylamine is used only the N-hydroxyl mono or di-substituted tetrahydro-1,3-oxazine is obtained.

Therefore, the first step of the reaction is illustrated by the following equations:

(1) When Y is hydrogen

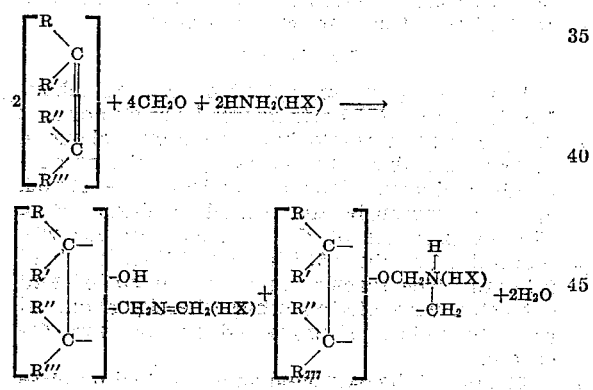

(2) When Y is alkyl, cycloalkyl or aryl

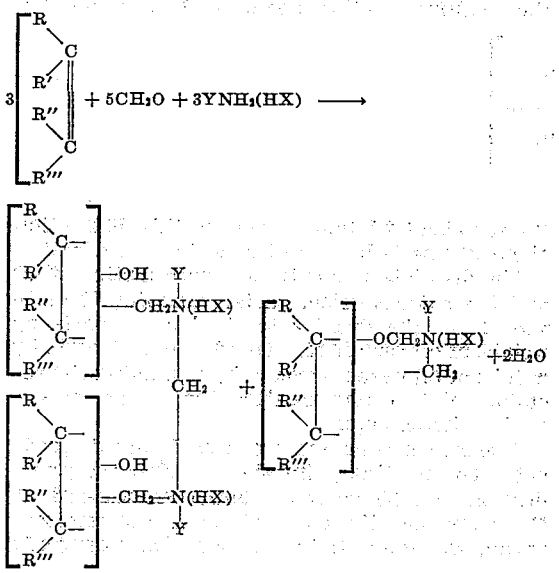

(3) When Y is hydroxyl

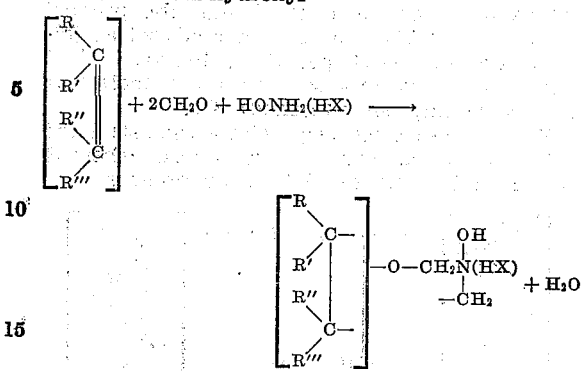

It will be appreciated by those skilled in the art that a detailed description of the treatment of all of the reactants represented by the general formula given hereinbefore is beyond the scope of this disclosure. However, it is believed that the following illustrative examples taken in conjunction with the general discussion given herein will suffice for a complete understanding of the scope of the present invention.

EXAMPLE 1

One mole of hydroxylamine hydrochloride (70 parts by weight) and 85 parts by weight of an aqueous solution containing 36 per cent formaldehyde (1 mole) were mixed. The temperature rose and upon falling to about 30° C. about 52 parts by weight (0.5 mole) of styrene were added. In the absence of external heat, the temperature of the resulting mixture slowly rose to 40° C., and was held at 40° ± 3° C. by external cooling. The reaction mixture was agitated and held at 40° ± 3° C. for two hours until the temperature fell to about 30° C. The reaction mixture was cooled further, unreacted hydroxylamine filtered off and the filtrate diluted with 100 parts by weight of water. The solution thus obtained was extracted with diethyl ether and the ether removed on a steam bath. Only about one part by weight of unreacted styrene was recovered from the ether extract. The aqueous solution after extraction with the ether was causticized with about one mole of sodium hydroxide in the form of a 20 per cent aqueous solution. The causticized aqueous solution was then extracted with diethyl ether and the ether solution evaporated to yield about 72 parts by weight of a light-yellow, viscous amine as a residue. The amine was found to have a nitrogen content of 6.58 per cent.

EXAMPLE 2

About 170 parts by weight of an aqueous 36 per cent solution of formaldehyde (about 2.0 moles) and about 54 parts by weight of ammonium chloride (about 1 mole) were added to about 52 parts by weight of styrene (about 0.5 mole). The reaction mixture so-formed was agitated and warmed to about 75° C., held at about 80° C. for thirty minutes, cooled and about 30 parts by weight of unreacted styrene and probably reaction products of styrene and excess formaldehyde removed. The aqueous layer was treated with about one mole of sodium hydroxide as a 20 per cent aqueous solution and extracted with diethyl ether. The ether extract was evaporated to yield about 44 parts by weight of a light-yellow, viscous oil which crystallized upon standing. The crude amine had a nitrogen content of 7.80%.

A sample of the semi-crystalline amine was dissolved in alcohol. A white crystalline mate-

11 rial separated upon cooling. After three recrystallizations from aqueous alcohol the product melted at 126.5°–127.5° C. and analyzed as follows: Carbon—74.11 per cent; hydrogen—7.75 per cent; nitrogen—8.31 per cent; molecular weight (boiling point method) 376.

These values check very well for the calculated values for a Compound V type material where R is C₆H₅ and R', R" and R'" are hydrogens.

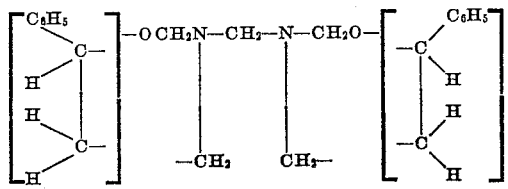

| | C | H | N |
|---|---|---|---|
| | Percent | Percent | Percent |
| Calculated for C₂₁H₂₆N₂O₂ | 74.56 | 7.70 | 8.30 |
| Found | 74.11 | 7.75 | 8.31 |

Calculated Molecular Weight 338; found 376.

EXAMPLE 3

Thirty parts by weight of paraformaldehyde (about 1 mole of CH₂O), about 54 parts by weight of ammonium chloride (about 1 mole), and about 105 parts by weight of glacial acetic acid and about 10 parts by weight of water were added to about 56 parts of diisobutylene (about 0.5 mole). The reaction mixture formed as described hereinbefore was warmed to about 65° C. at which temperature a noticeable reaction started. The source of external heat was removed but the temperature rose to about 74° C. before beginning to fall. Thereafter the temperature was maintained at about 70° to about 73° C. for about one hour. The reaction mixture was cooled and 30 parts by weight of unreacted octylenes recovered. The residue was neutralized with three moles of sodium hydroxide as a 40 per cent aqueous solution and extracted with diethyl ether. The ether extract was evaporated to obtain about 41 parts by weight of a light-red, viscous amine. Analysis of this product indicated that the nitrogen content thereof is 6.34 per cent.

This product was contaminated with by-product m-dioxane and contained as its principal constituent a bis-methane corresponding to the formula:

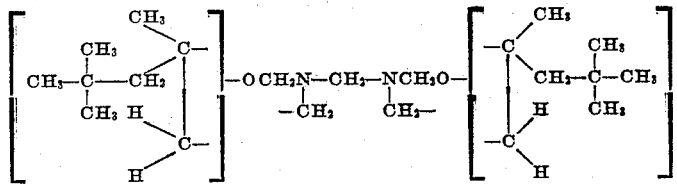

EXAMPLE 4

About fifty-nine parts by weight of alpha-methyl styrene

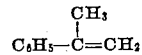

(about 0.5 mole), about 167 parts by weight of an aqueous 36% formaldehyde solution (about 2 moles CH₂O) and about 54 parts by weight of ammonium chloride (about 1 mole) were mixed, agitated vigorously and heated to about 75° C. The external source of heat was removed and the temperature of the mixture rapidly rose to about 83° C. The reaction mixture was cooled to about

12

80° C. at which temperature the reaction became a clear, homogeneous solution. The temperature began to fall and was allowed to drop to room temperature (20° C.). The solution was causticized with aqueous 20% sodium hydroxide solution and a very viscous colorless liquid separated. The mixture was extracted three times with diethyl ether and the extract dried over anhydrous calcium sulfate. After drying and removing the solvent, a very viscous liquid remained. Analysis of this liquid showed that it contained 7.79 per cent nitrogen, the calculated nitrogen value for a compound of the type of IIa; i. e.,

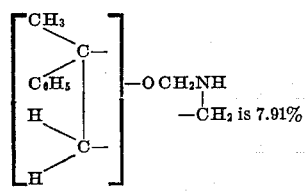

EXAMPLE 5

In a manner similar to that described in Example 2 hereinbefore about 100 parts by weight of alpha-pinene (about 0.73 mole) were reacted with about 170 parts by weight of a 36 per cent aqueous solution of formaldehyde (about 2 moles) and about 108 parts by weight of ammonium chloride (about 2 moles). Upon cooling about 70 parts by weight of unreacted material was recovered and about 47 parts by weight of an oily, viscous, light-red amine having a nitrogen content of 6.76 per cent was recovered.

EXAMPLE 6

About 104 parts by weight of styrene (about 1 mole), about 335 parts by weight of an aqueous 36 per cent formaldehyde solution (about 4 moles) and about 108 parts by weight of ammonium chloride (about 2 moles) were mixed, agitated vigorously and heated to about 80° C. The temperature of the reaction mixture was maintained at about 75° to about 80° C. for about 2 hours. The reaction mixture was cooled and extracted with diethyl ether whereby about 45 parts by weight of unreacted styrene were recovered.

The pH of the extracted aqueous reaction mixture was raised to about 4 by the addition of 20 per cent aqueous sodium hydroxide solution and the resulting solution steam distilled (about 105° C.) for about 2.5 hours. During this distillation about 250 parts by weight of water was added.

The distillate was extracted with diethyl ether and the extract dried. After removing the solvent from the dried extract about 9 parts by weight of oil remained. An additional 4 parts by weight of oil were recovered by extracting the reaction mixture and treating the extract as described hereinbefore.

A semicarbazone was prepared from this product. The melting point thereof after recrystallization from 95 per cent ethanol was 222–223° C. Upon analysis the composition of the semicarbazone was found to be: Carbon—58.17 per cent;

hydrogen—5.66 per cent; and nitrogen—25.68 per cent. These values are to be compared with the calculated values for $C_8H_9N_3O$ of carbon—58.89 per cent; hydrogen—5.52 per cent; and nitrogen—25.77 per cent. The observed values agree with the calculated values for the semicarbazone of benzaldehyde. Upon mixing the prepared semicarbazone with an authentic sample of the semicarbazone of benzaldehyde and determining the melting point of the mixture no depression of the melting point was observed.

The reaction mixture was causticized with 40 per cent aqueous sodium hydroxide solution and extracted with diethyl ether. The extract was dried over anhydrous calcium sulfate (other drying agents of this type can be used) and the solvent removed. Seventy-two parts by weight of product were obtained. Sixty-four parts by weight of the product were distilled with the results as indicated by the following log of the distillation.

Table I

| Fraction No. | Pot Temp., °C. | Vapor Temp., °C. | Pressure, mm. of Hg | $n_D^{20}$ | Parts by Weight |
|---|---|---|---|---|---|
| IBP | | 85 | 1.5 | | |
| 1 | | 95 | 1.5 | 1.5212 | 4 |
| 2 | | 108 | 2.0 | 1.5276 | 10 |
| 3 | 150 | 118 | 2.5 | 1.5326 | 11 |
| 4 | 173 | 119 | 2.0 | 1.5370 | 6 |
| 5 | 187 | 124 | 2.0 | 1.5428 | 4 |

A methiodide was prepared from fraction #3 which after recrystallization from absolute ethanol melted at 177°–177.5° C. This methiodide was analyzed; the observed values are compared with the calculated values of $C_{12}H_{18}INO$ hereinafter:

| | Carbon | Hydrogen | Nitrogen |
|---|---|---|---|
| Calculated for $C_{12}H_{18}INO$ | 45.15 | 5.64 | 4.39 |
| Observed | 45.76 | 5.18 | 4.38 |

It follows that the structure of the methiodide corresponds to the following formula:

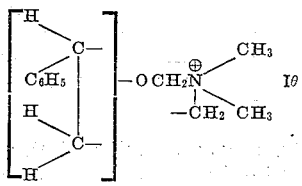

EXAMPLE 7

About 34 parts by weight of methylamine hydrochloride (about 0.5 mole) and about 42 parts by weight of an aqueous 36% formaldehyde solution (about 0.5 mole $CH_2O$) were added to about 57 parts by weight of styrene about (0.55 mole). The reaction mixture was agitated vigorously and warmed at 75°–82° C. for about 2.5 hours. After cooling, about 47 parts by weight of styrene were recovered. The remainder of the reaction mixture was neutralized with 20% aqueous sodium hydroxide solution. The neutralized reaction mixture was extracted with diethyl ether. Removal of the solvent left 22 parts by weight of a light-yellow oil possessing the strong, penetrating odor of an amine.

This material when analyzed contained 11.5 per cent of nitrogen. It reacted with phenyl isothiocyanate to give a phenylthiourea and formed a crystalline picrate when treated with picric acid. After three recrystallizations from ethanol the picrate melted at 160°–161° C. The crystalline picrate was analyzed; the observed values are compared with the calculated values hereinafter.

| | Carbon | Hydrogen | Nitrogen |
|---|---|---|---|
| Calculated for $C_{17}H_{18}N_4O_8$ | 50.25 | 4.43 | 13.79 |
| Observed | 50.21 | 3.55 | 14.34 |

EXAMPLE 8

About 50 parts by weight of amine obtained as described in prior example from styrene, formaldehyde and ammonium chloride (Example 6), were dissolved in about 170 parts by weight of benzene. About 108 parts by weight of 95 per cent acetic anhydride were added to the solution of formaldimine. After the initial heat of reaction had subsided, the reaction mixture was heated on a steam bath (90°–95° C.) for about 1 hour. Polymeric formaldehyde condensed upon the cooler walls of the reflux condenser during this period. The benzene was removed by evaporation and the residue warmed to about 150–160° C. at a pressure of 15 mm. of mercury to remove all of the unreacted acetic anhydride and free acetic acid. It would be expected that such treatment would cause pyrolysis of an aralkyl acetate that formed with the splitting off of acetic acid. The pressure was then reduced to 0.9 mm. of mercury and the distillation continued. The distillation was discontinued when there were about 24 parts by weight of pot residue. Upon standing at room temperature (about 20° C.) for about 16 hours both the distillate and the residue crystallized. After two recrystallizations from n-heptane the crystals from the distillate melted at 83°–83.5° C. The crystalline product from the distillate was analyzed; the values so obtained are compared with the calculated values for $C_{12}H_{15}NO_2$ hereinafter

| | Carbon | Hydrogen | Nitrogen |
|---|---|---|---|
| Calculated for $C_{12}H_{15}NO_2$ | 70.24 | 7.32 | 6.83 |
| Observed | 70.38 | 7.55 | 6.74 |

Thus, it would appear that the crystals are those of a compound having a composition corresponding to the formula

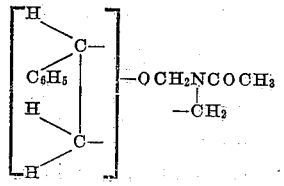

derived from a compound having the structure

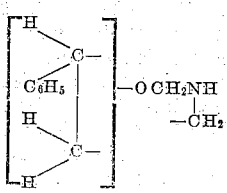

About 20 parts by weight of the crystals obtained as aforedescribed from the distillate were dissolved in about 100 parts by weight of 20 per cent aqueous sulfuric acid and warmed on a steam bath (90°–95° C.) for four hours. The reaction mixture was cooled and 20 parts by weight of sodium hydroxide added slowly. The causticized reaction mixture was then extracted with diethyl ether. Evaporation of the ether left a pale-yellow amine which formed a crystalline phenylthiourea when treated with phenyl isothiocyanate. After three recrystallizations from absolute ethanol the phenylthiourea melted at 127.5°–128.5° C. This phenylthiourea was analyzed; the results are compared with the calculated values for $C_{17}H_{18}N_2OS$ hereinafter.

|  | Carbon | Hydrogen | Nitrogen |
|---|---|---|---|
| Calculated for $C_{17}H_{18}N_2OS$ | 68.45 | 6.04 | 9.40 |
| Observed | 68.29 | 6.25 | 10.01 |

This corresponds to the formula

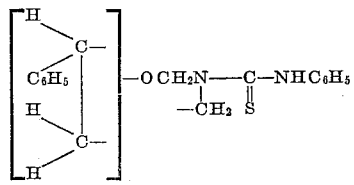

A methiodide of this amine was prepared which after two recrystallizations from ethanol melted at 176°–177° C. A mixed melting point with the methiodide of Example 6 gave no depression of the melting point.

EXAMPLE 9

Example 2 was repeated using about 5 moles of styrene, about 20 moles of formaldehyde (in aqueous solution) and about 10 moles of ammonium chloride. The reaction mixture was heated for three hours. After cooling, the reaction mixture was extracted with diethyl ether and about 1 mole of unreacted styrene recovered. The extracted reaction mixture failed to crystallize even after seeding. A portion of the reaction mixture was distilled as indicated in the following log of the distillation:

| Fraction No. | Vapor Temp., °C. | Pressure, mm. of Hg | Parts by Weight | $n_D^{20}$ |
|---|---|---|---|---|
| IBP | 74 | 3.0 |  |  |
| 1 | 79 | 3.0 | 11 | 1.5299 |
| 2 | 94 | 1.0 | 60 | 1.5345 |
| 3 | 96 | 0.6 | 22 | 1.5412 |
| 4 | 106 | 0.6 | 12 | 1.5478 |
| 5 | 123 | 0.5 | 11 |  |
| 6 | 128 | 0.5 | 28 |  |
| 7 | 131 | 1.0 | 14 |  |
| Pot Residue |  |  | 83 |  |

Fraction #2 formed a phenylthiourea which after recrystallization from Formula #30 denatured alcohol, melted at 124.5°–125.5° C. A mixed melting point of this phenylthiourea and that of Example 8 showing no depression.

Fraction #2 also formed a methiodide which, after recrystallization from absolute ethanol, melted at 175.5°–176.5° C. This methiodide when mixed with the methiodide obtained in Example 6 showed no depression of the melting point.

EXAMPLE 10

About 300 parts by weight of paraformaldehyde (about 10 moles of $CH_2O$), about 268 parts by weight of ammonium chloride (about 5 moles) and about 90 parts of water (about 5 moles) as a depolymerizer of the reversible polymer of formaldehyde were mixed and placed in a reactor equipped with a stirrer. About 280 parts by weight of liquid isobutylene were charged to the reactor by displacement with a measured volume of ethylene glycol.

The reactor was heated slowly to about 165° F. and the source of external heat removed. At this time the pressure within the reactor reached about 100 p. s. i. (gauge) and then began to drop rapidly although the temperature of the reaction mixture continued to rise to a maximum of about 225° F.

After the temperature of the reaction mixture had fallen to about 135° F. the stirrer was stopped and the unit allowed to cool slowly. After about 16 hours, no pressure was recorded on the gauge; an indication of substantially complete reaction of the isobutylene.

The reaction mixture was extracted with diethyl ether and the extract dried over anhydrous calcium sulfate. Removal of the solvent yielded 51 parts by weight of a pale-yellow liquid. About 40 parts by weight of this liquid were distilled in the manner and with the results indicated by the following log:

| Fraction No. | Vapor Temp., °C. | Pressure, mm. Hg | $n_D^{20}$ | Parts by Weight |
|---|---|---|---|---|
| IBP | 35 | atm. |  |  |
| 1 | 48 | atm. |  | 3 |
| 2 | 55 | atm. |  | 4 |
| 3 | 65 | atm. | 1.3786 | 2 |
| 4 | 82 | atm. | 1.3834 | 2 |
| 5 | 87 | atm. | 1.3864 | 3 |
| 6 | 92 | atm. | 1.3898 | 2 |
| 7 | 92.5 | atm. | 1.3938 | 3 |
| 8 | 93.5 | atm. | 1.4022 | 1 |
| 9 | 93.5 | atm. | 1.4130 | 5 |
| 10 | 57 | 0.07 | 1.4350 | 2 |
| 11 | 62 | 0.07 | 1.4445 | 1 |
| Pot Residue |  | Dark brown liquid |  | 3 |

Fraction #7 was analyzed with the results indicated below and compared with the calculated carbon and hydrogen content of $C_6H_{12}O_2$

|  | Carbon | Hydrogen |
|---|---|---|
| Calculated for $C_6H_{12}O_2$ | 62.07 | 10.34 |
| Observed | 57.55 | 9.90 |

Subsequently, it was established that this material was contaminated with about 7 per cent of water and was an impure sample of 4,4-dimethyl-1,3-dioxane,

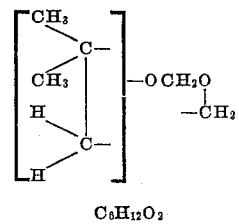

The raffinate from the foregoing extraction was treated with about 220 parts by weight of sodium hydroxide and the precipitated salt separated. The liquid remaining was extracted with diethyl ether and the extract dried over anhydrous calcium sulfate. About 327 parts by weight of a dark liquid were recovered upon evaporation of the solvent. About 316 parts by weight of this liquid were distilled with the results indicated in the following log of the distillation:

| Fraction No. | Vapor Temp., °C. | Pressure, mm. of Hg | Parts by Weight | $n_D^{20}$ |
|---|---|---|---|---|
| IBP | 28 | 100 | | |
| 1 | 30 | 100 | 23 | |
| 2 | 40 | 98 | 30 | 1.3744 |
| 3 | 43 | 98 | 11 | 1.3848 |
| 4 | 45 | 98 | 9 | 1.3910 |
| 5 | 48 | 98 | 22 | 1.4080 |
| 6 | 66 | 32 | 10 | 1.4392 |
| 7 | 67 | 32 | 10 | 1.4480 |
| 8 | 69 | 32 | 17 | 1.4506 |
| 9 | 61 | 8.5 | 12 | 1.4544 |
| 10 | 71 | 8.0 | 11 | 1.4586 |
| 11 | 67 | 0.1 | 9 | 1.4630 |
| 12 | 72 | 0.1 | 27 | 1.4654 |
| 13 | 75 | 0.5 | 6 | 1.4650 |
| 14 | 89 | 0.8 | 13 | 1.4714 |
| 15 | 92 | 1.1 | 12 | 1.4760 |
| 16 | <80 | 1.5 | 4 | 1.4785 |

The pot residue was a dark (almost black) viscous liquid which, on cooling, set up to a tacky, semi-solid mass. During the distillation of fractions #1 through #5, the receiver was immersed in a Dry Ice-acetone bath. Signs of decomposition were apparent at a pot temperature of 145° C.

Nitrogen analyses and molecular weight determinations of several fractions of the distillate were made with the results given in Table II.

*Table II*

| Fraction No. | Observed Percent Nitrogen | Observed Molecular Weight |
|---|---|---|
| 3 | 4.94 | 50 |
| 5 | 9.70 | 60 |
| 7 | 11.54 | 60 |
| 10 | 11.07 | 145 |
| 15 | 11.38 | 152 |

It is apparent that fractions 3 and 5 are contaminated with water which can be separated by adding potassium carbonate to the lower boiling fractions, separating the organic layer, and redistilling to obtain the pure anhydrous amine.

A crystalline methiodide was formed with the material of fraction #8 in the usual manner by reaction with methyl iodide. After recrystallization from absolute ethanol this methiodide melted at 266°–267° C. (corrected) with decomposition.

The methiodide was analyzed; the results are compared with the calculated values for $C_8H_{18}INO$ in the following tabulation:

| | Carbon | Hydrogen | Nitrogen |
|---|---|---|---|
| Calculated for $C_8H_{18}INO$ | 35.42 | 6.64 | 5.17 |
| Observed | 35.25 | 6.69 | 5.33 |

These values are those corresponding to the methiodide obtained in the reaction

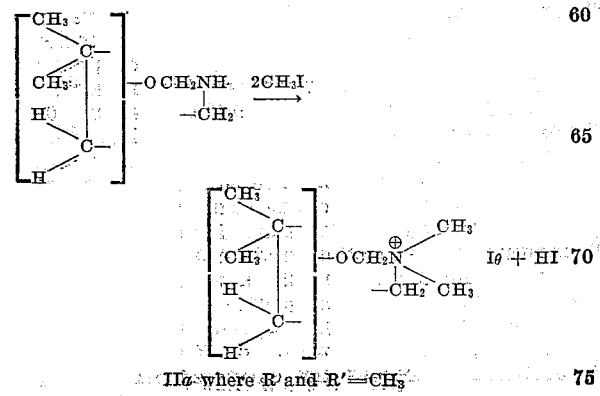

IIa where R and R'=CH₃

Fractions 3, 5, 12 and 15 also formed methiodides although in the instances of fractions 3 and 5 the formation is slower and the amount of crystalline derivative from the amine is less, indicating the presence of water in which the methiodides are soluble. A melting point determination for a mixture of the methiodides from fractions 8 and 15 gave no significant depression thus establishing the identity of the methiodides from these two fractions.

EXAMPLE 11

About 1340 parts by weight of a 36% aqueous solution of formaldehyde and about 428 parts by weight of ammonium chloride were placed in a pressure resistant container equipped with a stirrer. While this mixture was being stirred about 450 parts by weight of liquid isobutylene were pumped into the mixture. The container was sealed and the mixture heated slowly to a maximum temperature of 155° F. at which temperature the pressure was 103 p. s. i. (gauge). The pressure fell off rapidly and after cooling to 145° F. had fallen to 35 p. s. i. (gauge). The reaction mixture was allowed to cool to ambient temperatures (20°–25° C.), the residual pressure vented and the reaction mixture extracted with diethyl ether. The extract was dried over anhydrous calcium sulfate, the solvent removed and 57 parts by weight of liquid product recovered.

The extracted reaction mixture (raffinate) was treated with 1200 parts by weight of a 40 per cent aqueous solution of sodium hydroxide and 200 parts by weight of water. After cooling the resultant mixture to room temperature (20°–25° C.) it was extracted with diethyl ether. The ether extract was dried over anhydrous calcium sulfate and the solvent removed. Seven hundred and eighteen parts by weight of liquid amine were obtained.

EXAMPLE 12

The procedure of Example 11 was followed except that the maximum reaction temperature attained was 144° F. Extraction of the reaction mixture yielded about 34 parts by weight of product and extraction of the raffinate; i. e., causticized extracted reaction mixture, yielded 703 parts by weight of amine.

About 10 per cent of the extracted causticized reaction mixture was treated with an amount of potassium carbonate in excess of that required to saturate the solution and extracted with diethyl ether. After drying and removing the solvent 7 parts by weight of amine were obtained. Thus, the yield of amine can be increased about 10 per cent by this procedure.

It is to be noted that the amines are soluble in all proportions in water and therefore are difficult to extract from aqueous solutions.

EXAMPLE 13

The procedure of Example 11 was followed except that the maximum reaction temperature was 142° F. Extraction of the acidic reaction mixture yielded 38 parts by weight of product while extraction of the causticized reaction mixture yielded 686 parts by weight of amine.

EXAMPLE 14

The procedure of Example 11 was followed except that the maximum reaction temperature was 147° F. Extraction of the acidic reaction mixture yielded 59 parts by weight of product and extraction of the causticized reaction mixture yielded 713 parts by weight of amine. A sample of this amine was dried under high vacuum over a drying agent and analyzed. The nitrogen content of the dried sample was 10.35 per cent.

The amine product from this run was a clear, pale-orange liquid which does not change appearance on storage. The yield was comparable to the other similar runs but the product appears to be superior. Therefore, the time, temperature and pressure data are presented in the following log:

| Time, Minutes | Pressure, p. s. i. (Gauge) | Temperature, °F. |
|---|---|---|
| 0 | 50 | 100 |
| 4 | 55 | 109 |
| 6 | 60 | 115 |
| 9 | 70 | 130 |
| 11 | 75 | 137 |
| 13 | 80 | 140 |
| 15 | 85 | 145 |
| 17 | 85 | 147 |
| 19 | 90 | 147 |
| 21 | 90 | 147 |
| 23 | 90 | 147 |
| 25 | 90 | 147 |
| 27 | 90 | 147 |
| 29 | 90 | 147 |
| 31 | 85 | 147 |
| 33 | 85 | 145 |
| 35 | 80 | 145 |
| 37 | 80 | 145 |
| 39 | 80 | 143 |
| 44 | 70 | 143 |
| 49 | 65 | 140 |
| 119 | 30 | 120 |

(It is to be noted that the reactor was warm (100°–105° F.) when the reactants were charged. Therefore, no external heat was required to initiate the reaction.)

The products obtained by extracting the acidic reaction mixtures of Examples 11, 12, 13 and 14 were combined and dried over anhydrous potassium carbonate. The drying agent was removed and 198 parts by weight of product were distilled as follows:

| Fraction No. | Vapor Temp., °C. | Pressure, mm. of Hg | $n_D^{20}$ | Parts by Weight |
|---|---|---|---|---|
| IBP | 35 | atmos. | | |
| 1 | 74 | atmos. | 1.3762 | 7 |
| 2 | 77 | atmos. | 1.3799 | 6 |
| 3 | 80 | atmos. | 1.3829 | 4 |
| 4 | 85 | atmos. | 1.3881 | 13 |
| 5 | 90 | atmos. | 1.3930 | 13 |
| 6 | 95 | atmos. | 1.4006 | 12 |
| 7 | 100 | atmos. | 1.4080 | 8 |
| 8 | 105 | atmos. | 1.4133 | 5 |
| 9 | 115 | atmos. | 1.4180 | 10 |
| 10 | 125 | atmos. | 1.4215 | 12 |
| 11 | 124 | atmos. | 1.4224 | 26 |
| 12 | 124 | atmos. | 1.4208 | 34 |
| 13 | 108 | 1.0 | 1.4362 | 17 |
| 14 | 132 | 1.0 | 1.4525 | 5 |
| Residue | | | | 6 |

Fractions 6 through 11 were cloudy, containing some fluffy, white solid, probably polymeric formaldehyde. This same material coated the inside of the condenser tube of the still.

All of the distillate was combined and dissolved in about 180 parts by weight of diethyl ether and the solution washed with 10 per cent aqueous sodium bisulfite solution and thereafter with water. The washed ether solution was dried for about 6 hours over anhydrous calcium sulfate and then over anhydrous potassium carbonate for about 10 days. After removal of the desiccant and the solvent 98 parts by weight were fractionated through a column 12 inches in height packed with glass helices. The log of the distillation follows:

| Fraction No. | Vapor Temp., °C. | Pressure, mm. of Hg | $n_D^{20}$ | Parts by Weight |
|---|---|---|---|---|
| IBP | 35 | atmos. | | |
| 1 | 36 | atmos. | ether | 23 |
| 2 | 79 | atmos. | 1.3773 | 4 |
| 3 | 79 | atmos. | 1.3830 | 3 |
| 4 | 122.5 | atmos. | 1.4081 | 7 |
| 5 | 126 | atmos. | 1.4210 | 5.5 |
| 6 | 128 | atmos. | 1.4216 | 8 |
| 7 | 129 | atmos. | 1.4219 | 10 |
| 8 | 129 | atmos. | 1.4219 | 11 |
| 9 | 129 | atmos. | 1.4213 | 6 |
| 10 | 56–63.5 | 49→11 | 1.4211 | 3.5 |
| 11 | 61 | 11→1 | 1.4218 | 3 |
| 12 | 78 | 1 | 1.4348 | 2.5 |
| Residue | | | | 3 |
| Cold trap | | | | 2 |

Fraction #7 was analyzed; the observed values are compared for the calculated values for $C_6H_{12}O_2$ as follows:

| | Carbon | Hydrogen |
|---|---|---|
| Calculated for $C_6H_{12}O_2$ | 62.07 | 10.34 |
| Observed | 62.22 | 10.52 |

The calculated values are those for a compound having the structure

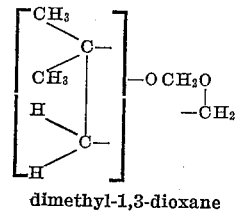

dimethyl-1,3-dioxane

EXAMPLE 15

About fifty parts by weight of a 36 per cent aqueous solution of formaldehyde and about 41 parts by weight of dimethylamine hydrochloride were added to about 56 parts by weight of styrene. The reaction mixture was agitated vigorously and heated to 75° C. The temperature of the reaction mixture was maintained at about 75° C. for about ninety minutes. About fifty-six parts by weight of styrene were recovered from the reaction mixture. Causticization of the reaction mixture did not yield any amine.

EXAMPLE 16

About 68 parts by weight of methylamine hydrochloride (about 1 mole), about 60 parts by weight of paraformaldehyde (about 2 moles $CH_2O$), and about 63 parts by weight of glacial acetic acid (depolymerizer for the reversible formaldehyde polymer) were added to about 104 parts by weight of styrene (about 1 mole). The reaction mixture was agitated vigorously and heated to about 70° C. The source of external heat was removed and the temperature of the reaction mixture rose to about 83° C. The temperature of the reaction mixture was maintained at about 80° C. for about 2 hours. After cooling, the mixture was extracted with diethyl ether to remove unreacted styrene, m-dioxanes, acetic acid, etc., and then causticized. The causticized reaction mixture was then extracted with diethyl ether. Removal of the solvent yielded 124 parts by weight of amine which was distilled as follows:

| Fraction No. | Final Vapor Temp., °C. | Pressure, mm. of Hg | $n_D^{20}$ | Parts by Weight |
|---|---|---|---|---|
| IBP | 90 | 2.0 | | |
| 1 | 99 | 2.1 | 1.5244 | 7 |
| 2 | 98-98.5 | 1.3 | 1.5280 | 17 |
| 3 | 118 | 1.5 | 1.5294 | 11 |
| 4 | 132 | 1.5 | 1.5320 | 6 |
| 5 | 137-138 | 1.5 | 1.5386 | 21 |
| Residue | | | | 56 |

Fraction #2 did not form a phenylthiourea but did form a methiodide and picrate by standard procedures. After recrystallizing from 95 per cent ethanol, the picrate melted at 157°-158° C.

A mixed melting point with the picrate obtained from styrene, ammonium chloride and formaldehyde which had been heated at reflux temperature for about twenty-four hours showed no depression. An analysis of this latter amine-picrate is compared with the calculated value for a compound corresponding to the empirical formula $C_{17}H_{18}N_4O_8$ as follows:

| | Percent Carbon | Percent Hydrogen | Percent Nitrogen |
|---|---|---|---|
| Calculated for $C_{17}H_{18}N_4O_8$ | 50.25 | 4.43 | 13.79 |
| Observed | 49.89 | 4.59 | 13.93 |

Thus, it is apparent that the amine obtained as described hereinbefore has a composition corresponding to the formula

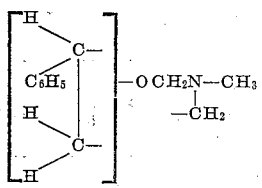

After recrystallization from absolute ethanol, the methiodide obtained from fraction #2 melted at 178°-178.5° C. A mixed melting point determination of this compound and the methiodide of the amine obtained in Example 6 showed no depression of the melting point.

Fraction #5 did not form a methiodide but did form a picrate and a phenylthiourea when treated according to standard procedure. However, these derivatives could not be crystallized.

EXAMPLE 17

About 22 moles of $CH_2O$ in the form of paraformaldehyde and about 11 moles of ammonium chloride together with about 750 parts by weight of water were added to about 10.8 moles of styrene. (The water is a depolymerizer of the reversible polymer of formaldehyde.) The reaction mixture was agitated vigorously and warmed to 55° C. The source of external heat was removed and the temperature of the mixture rose to 80° C. Thereafter the reaction mixture was heated to 100° C. and held at that temperature for a few minutes after which the temperature was allowed to fall and was controlled at about 80 to 85° C. The reaction mixture was held in this latter temperature range for about 6 hours.

After cooling and standing, the reaction mixture separated into three layers. About 2.8 moles of unreacted styrene (top layer) were separated. The middle layer appeared to be an aqueous solution, while the bottom layer was an oily material relatively insoluble in water. The middle and bottom layers were extracted as one liquid with diethyl ether. About 284 parts by weight of liquid were recovered from the extract by evaporation of the solvent. This material was a mixture of unreacted styrene, m-dioxanes and other oxygenated materials formed by side reactions. The aqueous middle layer and the oily bottom layer were then treated separately with about 10 moles of sodium acetate and extracted with diethyl ether. Upon removal of the solvent 20 parts by weight of extract were obtained from the aqueous layer and about 188 parts by weight of material from the extract of the oily bottom layer. These extracts were combined and distilled under a vacuum as follows:

| Fraction No. | Vapor Temp., °C. | Pressure, mm. of Hg | $n_D^{20}$ | Parts by Weight |
|---|---|---|---|---|
| 1 | (1) | (1) | (1) | (1) |
| IBP | 46 | 1.0 | | 43 |
| 2 | 48 | 2.8 | 1.4561 | 5 |
| 3 | 82 | 1.6 | 1.4803 | 13 |
| 4 | 82.5 | 0.5 | 1.5238 | 22.5 |
| 5 | 115.5 | 0.6 | 1.5345 | 13.5 |
| 6 | 146 | 0.8 | 1.5535 | 10 |
| 7 | 191 | 0.9 | 1.5687 | 17.5 |
| 8 | 202 | 2.0 | 1.5687 | 23.5 |
| Residue | | | | 35 |

[1] Acetic acid; temperature and pressure not constant.

Fraction #8 was analyzed and found to contain: carbon—78.36 per cent; hydrogen—7.70 per cent; nitrogen—6.00 per cent. The molecular weight of this fraction was 252. The residue was analyzed and found to contain 4.93 per cent nitrogen and to have a molecular weight of 521.

The organic material (bottom layer) and the aqueous middle layer were combined and treated with 10 moles of ammonium hydroxide. The causticized mixture was then extracted with diethyl ether. After removal of the solvent from the extract 533 parts by weight of a liquid were obtained. This liquid was distilled in accordance with the following log:

| Fraction No. | Vapor Temp., °C. | Pressure, mm. of Hg | $n_D^{20}$ | Parts by Weight |
|---|---|---|---|---|
| IBP | 76 | 5.0 | | |
| 1 | 107.5 | 2.7 | 1.5354 | 47 |
| 2 | 94.5 | 1.5 | 1.5368 | 38.5 |
| 3 | 110 | 1.5 | 1.5389 | 24.5 |
| 4 | 133 | 1.7 | 1.5465 | 23.5 |
| 5 | 148.5 | 2.5 | 1.5568 | 41.5 |
| 6 | 134 | 2.2 | 1.5537 | 42.5 |
| 7 | 165 | 3.0 | 1.5540 | 27.5 |
| 8 | 136 | 2.8 | | |
| 9 | 116 | 2.6 | | |
| Residue | | | | 232 |

After Fraction #7 was removed, the decomposition became apparent and water collected in the cold trap.

Upon analysis fraction #2 was found to contain 74.70 per cent carbon; 8.31 per cent hydrogen and 5.97 per cent nitrogen.

The aqueous layer from the last extraction was treated with 10 moles of sodium hydroxide and after cooling, was extracted with diethyl ether. After removal of the solvent from the extract 212 parts by weight of amine were obtained. This amine was distilled as follows:

| Fraction No. | Vapor Temp., °C. | Pressure, mm. of Hg | $n_D^{20}$ | Parts by Weight |
|---|---|---|---|---|
| 1 | ether | atm. | | 16.5 |
| 2 | 75.5–86.5 | 2.5–1.5 | 1.5300 | 12 |
| 3 | 86 | 1.2 | 1.5329 | 27.5 |
| 4 | 91.5 | 1.5 | 1.5353 | 13 |
| 5 | 102.5 | 1.7 | 1.5411 | 30.5 |
| 6 | 119 | 2.9 | 1.5445 | 28 |
| 7 | 134 | 2.1 | 1.5501 | 23 |
| 8 | 126 | 1.7 | 1.5578 | 10.5 |
| Residue | | | | 32 |

Fraction #2 was analyzed and found to contain 8.95 per cent nitrogen. When treated with phenylisothiocyanate Fraction #2 formed a phenylthiourea in the usual manner. After recrystallization from 95 per cent ethanol the phenylthiourea melted at 92°–92.5° C. Upon analysis it was found that the phenylthiourea derivative of fraction #2 contained 70.77 per cent carbon, 6.66 per cent hydrogen and 10.60 per cent nitrogen.

EXAMPLE 18

About 15 moles of formaldehyde (as an aqueous 35 per cent formaldehyde solution) and about 7.5 moles of ammonium chloride were added to about 5.25 moles of alpha-methyl styrene. The mixture was agitated vigorously and heated to 66° C. The source of external heat was removed but the reaction temperature continued to rise. When the temperature of the reaction mixture reached 79° C. external cooling was resorted to but the temperature continued to rise until a temperature of 86° C. was reached after which the temperature began to fall. After the temperature of the reaction mixture had fallen to 80° C. external cooling was discontinued and the reaction temperature allowed to fall slowly to room temperature (20°–25° C.).

The reaction mixture was extracted three times with diethyl ether. Removal of the solvent from this extract left about 38 parts by weight of liquid which consisted primarily of the methylphenyl-1,3-dioxane.

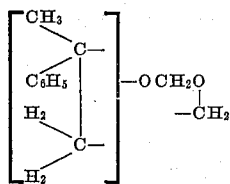

The raffinate or extracted reaction mixture was causticized with 28 per cent aqueous ammonium hydroxide and extracted with diethyl ether. Removal of the solvent yielded 819 parts by weight of liquid product. About 719 parts by weight of this product were distilled under reduced pressure. The data of this distillation is tabulated as follows:

| Fraction No. | Vapor Temp., °C. | Pressure, mm. of Hg | $n_D^{20}$ | Parts by Weight |
|---|---|---|---|---|
| IBP | 35 | atm. | | |
| 1 | 40 | atm. | | [1] 39 |
| 2 | 43.5–108.5 | 1.9–2.0 | 1.5390 | 39 |
| 3 | 108.5 | 1.6 | 1.5399 | 59.5 |
| 4 | 111.5 | 1.4 | 1.5418 | 54 |
| 5 | 111.5 | 1.1 | 1.5432 | 52 |
| 6 | 115 | 0.9 | 1.5463 | 50.5 |
| 7 | 120 | 1.0 | 1.5490 | 54 |
| 8 | 123 | 1.0 | 1.5470 | 43 |
| 9 | 157 | 1.8 | 1.5482 | 39 |
| 10 | 179.5 | 1.9 | 1.5499 | 55.5 |
| 11 | 185.5 | 1.8 | 1.5520 | 51.5 |
| 12 | 185.5 | 1.5 | 1.5528 | 27.0 |
| Residue | | | | 120 |

[1] Ether.

After standing about six weeks the distillate became very viscous. At that time the products were analyzed with the following results:

| Fraction No. | Percent Nitrogen | Molecular Weight |
|---|---|---|
| 3 | 7.61 | 203 |
| 5 | 8.26 | 288 |
| 7 | 7.86 | 312 |

The raffinate from the second extraction was causticized with 200 parts by weight of sodium hydroxide and extracted with diethyl ether. Removal of the solvent yielded an additional 82 parts by weight of product.

EXAMPLE 19

About 11 moles of formaldehyde (as a 36 per cent aqueous solution) and about 5.5 moles of ammonium chloride were added to about 5 moles of alpha-methylstyrene. The reaction mixture was stirred vigorously and warmed to 65° C. The source of external heat was removed and the temperature of the reaction mixture allowed to rise to about 80° C. and held at that temperature for about 1 hour. Thereafter, due to failure of the cooling system, the temperature rose to about 97° C. The mixture was cooled to about 80° C. and maintained at that temperature for about 3 hours and then allowed to cool to ambient temperature (20°–25° C.). The reaction mixture was treated with about 6 moles of sodium hydroxide and extracted with diethyl ether. The extract was dried over anhydrous calcium sulfate and the solvent removed. About 754 parts by weight of product were obtained. The product was distilled under reduced pressure as indicated by the following log of the distillation:

| Fraction No. | Final Vapor Temp., °C. | Pressure, mm. of Hg | $n_D^{20}$ | Parts by Weight |
|---|---|---|---|---|
| 1 | Below 36 | | 1.5285 | 43 |
| 2 | 58 | 1.1 | 1.5285 | 6.5 |
| 3 | 75.5 | 0.4 | 1.5305 | 26 |
| 4 | 91.5 | 0.8 | 1.5362 | 24 |
| 5 | 101 | 0.8 | 1.5439 | 40.5 |
| 6 | 110.5 | 0.9 | 1.5499 | 25.5 |
| 7 | 119.5 | 1.1 | 1.5527 | 30 |
| 8 | 130 | 1.5 | 1.5560 | 30.5 |
| 9 | 141 | 1.6 | 1.5618 | 31 |
| 10 | 143 | 0.9 | Partly Solid | 21 |
| 11 | 158 | 0.8 | Crystalline | 128 |
| Residue [1] | | | | 318 |

[1] A black solid. Analysis: Fraction #6—7.01 percent nitrogen. Residue—5.02 percent nitrogen; molecular weight, 367.

It is to be noted that since the reaction mixture was not extracted before causticizing, the product contains dioxanes and consequently the nitrogen content is low.

Fraction #6 reacted with phenylisothiocyanate but the phenylthiourea could not be crystallized. However, a crystalline methiodide was prepared from fraction #6 in the usual manner with methyl iodide. The methiodide contained 49.26 per cent carbon, 5.77 per cent hydrogen and 4.76 per cent nitrogen.

The crytals from fraction #10 were digested with boiling ether and then had a melting point of 159–160.5° C. After recrystallization from water the product melted at 159.5°–161° C. Upon analysis the recrystallized product was found to contain 73.12 per cent carbon, 8.54 per cent hydrogen and 7.66 per cent nitrogen.

The crystals obtained by recrystallization from water were recrystallized from benzene and washed with petroleum ether. After this treatment, the melting point was 159.50–160.5° C. After drying in vacuum the crystals were analyzed and found to contain 74.67 per cent carbon, 8.59 per cent hydrogen and 8.28 per cent nitrogen.

EXAMPLE 20

About 2 moles of formaldehyde (as a 36 per cent aqueous solution) and about 1 mole of methylamine hydrochloride were added to about 1 mole of alpha-methylstyrene. The reaction mixture was agitated and heated to about 70°–about 75° C. for about 2 hours. After cooling to ambient temperatures (20°–25° C.), the reaction mixture was extracted with diethyl ether. The extract was dried over anhydrous calcium sulfate, the solvent removed and about 48 parts by weight of organic material recovered.

The extracted reaction mixture (raffinate) was treated with about 1.5 moles of sodium hydroxide (as a 30 per cent aqueous solution) and the causticized reaction mixture or raffinate extracted with diethyl ether. The extract was dried and the solvent removed to yield about 155 parts by weight of amine.

A picrate was prepared from this amine by standard procedures the melting point of which after recrystallization from absolute ethanol was 240–241° C. (corr.). The picrate was analyzed. The analytical results are compared with the calculated values for $C_{18}H_{20}N_4O_8$ in the following tabulation:

| | Nitrogen, Percent |
|---|---|
| Calculated for $C_{18}H_{20}N_4O_8$ | 13.33 |
| Observed | 13.02 |

These analyses establish that the amine from which this picrate was prepared had a composition corresponding to the following formula:

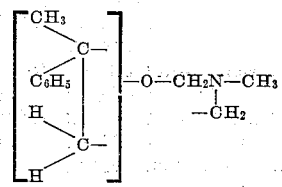

The remainder of this amine (about 106 parts by weight) was distilled as indicated in the following log:

| Fraction No. | Vapor Temp., °C. | Pressure, mm. of Hg | $n_D^{20}$ | Parts by Weight |
|---|---|---|---|---|
| IBP | 94 | 1.2 | | |
| 1 | 97 | 1.2 | 1.5250 | 5 |
| 2 | 98.5 | 1.2 | 1.5305 | 8 |
| 3 | 101 | 1.4 | 1.5316 | 13 |
| 4 | 106 | 1.5 | 1.5334 | 13 |
| 5 | 113 | 1.8 | 1.5370 | 11 |
| 6 | 123 | 1.2 | | 9 |
| 7 | 126 | 1.2 | | 3 |
| 8 | 125 | 0.5 | | 10 |
| Residue | | | | 11 |

Fractions #2 through #5 are primarily an amine such as that from which the picrate was prepared. Fraction #6 became viscous and began to crystallize. Fractions #7 and #8 were crystalline. After recrystallization from benzene the material from fraction #8 melted at 113–114° C. Analyses of these crystals are compared with the calculated values for $C_{23}H_{34}N_2O_2$ in the following tabulation:

| | Carbon | Hydrogen | Nitrogen |
|---|---|---|---|
| | Percent | Percent | Percent |
| Calculated for $C_{23}H_{34}N_2O_2$ | 74.59 | 9.19 | 7.57 |
| Observed | 74.95 | 8.98 | 7.71 |

These values indicate that the amine in question has a composition corresponding to the formula

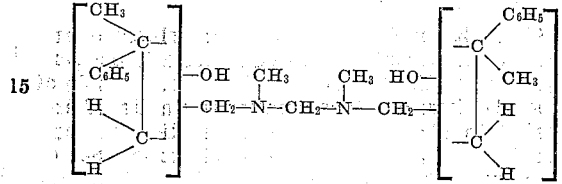

Fraction #8 formed a methiodide when treated with methyliodide in the usual manner. After recrystallization from absolute ethanol the derivative melted at 261°–262° C. (uncorr.).

| | Carbon | Hydrogen | Nitrogen |
|---|---|---|---|
| | Percent | Percent | Percent |
| Calculated for $C_{25}H_{40}N_2O_2I_2$ | 45.87 | 6.12 | 4.28 |
| Observed | 46.32 | 6.17 | 4.47 |

EXAMPLE 21

About 4 moles of ammonium chloride and about 4 moles of formaldehyde (as a 36% aqueous solution) were placed in a pressure resistant container and about 4 moles of liquid 1-butene charged to the container. The container was sealed and heated to a maximum temperature of about 165° F. while agitating the contents. The reaction mixture was allowed to cool to 110° F., the container vented and the reaction mixture cooled to ambient temperature (20°–25° C.). Undissolved ammonium chloride was removed and the residual reaction mixture extracted with diethyl ether. The extract was dried and the solvent removed. About 4 parts by weight of liquid product were recovered.

The raffinate was treated with excess sodium hydroxide (about 3.75 moles) and allowed to cool to room temperature (20°–25° C.). The causticized raffinate was extracted with diethyl ether and dried. Upon removal of the solvent about 3 parts by weight of amine were obtained.

EXAMPLE 22

About 8.4 moles of formaldehyde (as a 36% aqueous solution) and about 4.1 moles of ammonium chloride were added to about 300 parts by weight of a mixture containing 38.6 per cent divinylbenzene, 11.7 per cent diethylbenzene, 43.6 per cent ethylvinylbenzene and 6 per cent high boiling material. The reaction mixture was agitated and heated to about 80° C. The temperature of the reaction mixture was maintained at about 75° to about 80° C. for 3 hours. The reaction mixture was cooled to room temperature and treated with about 5 moles of sodium hydroxide (as a 40 per cent aqueous solution). After the addition of the caustic solution the color of the reaction mixture changed from pale orange to dark brown and a semi-resinous mass separated.

The mixture was extracted with diethyl ether in which only a portion of the resinous material dissolved. The ether solution was left in contact with the resinous mass for about 16 hours and then decanted. After drying the ether solution and removing the solvent about 294 parts by weight of liquid were obtained. The product contained 4.94 per cent nitrogen and had an average molecular weight of 251.

The resinous mass was dried by mixing with benzene and distilling off the benzene-water azeotrope. The resinous material is insoluble in ether, hot water, benzene, carbon tetrachloride and acetone and contains 6.93 per cent nitrogen.

EXAMPLE 23

About 2.1 moles of ammonium chloride and about 2.3 moles of formaldehyde (as a 35 per cent aqueous solution) were added to about 1 mole of 2-ethyl-1-hexene. The mixture was agitated and heated to about 65° C. The reaction mixture was held at a temperature of about 65°–69° C. for about 2 hours. The temperature of the reaction mixture was then raised to about 74° C. (reflux temperature) and held at that temperature for about 2 hours.

The reaction mixture was cooled to room temperature and about 0.9 mole of olefin recovered. The aqueous portion of the reaction mixture was treated with about 2.5 moles of sodium hydroxide (as a 40 per cent aqueous solution) and extracted with diethyl ether. After drying and removing solvent about 25 parts by weight of liquid product were obtained. This product had a nitrogen content of 9.66 per cent.

EXAMPLE 24

About 8 moles of formaldehyde (as a 36 per cent aqueous solution) and about 4 moles of ammonium chloride were added to about 2 moles of 2-methyl-1-pentene. The reaction mixture was agitated and warmed to about 53° C. The source of external heat was removed but the temperature of the reaction mixture rose at the rate of about 1° C. per minute to about 60.5° C. The temperature of the reaction mixture remained substantially constant at 60.5° C. for about 15 minutes and then began to fall slowly. The reaction mixture was allowed to cool to room temperature and the organic layer (about 68 parts by weight) was separated. The remaining reaction mixture was extracted with diethyl ether and the extract dried over anhydrous calcium sulfate. Removal of the solvent from the extract yielded about 45 parts by weight of liquid.

The extracted reaction mixture; i. e., raffinate was causticized with about 8 moles of sodium hydroxide (as a 40 per cent aqueous solution) and extracted with diethyl ether. This extract was dried over anhydrous calcium sulfate. The solvent was evaporated and 237 grams of amine recovered, which had a nitrogen content of 11.29 per cent.

EXAMPLE 25

About 8 moles of formaldehyde (as a 36 per cent aqueous solution) and about 4 moles of ammonium chloride were added to about 2 moles of 2-ethyl-1-butene. The reaction mixture was stirred and warmed to about 50° C. The source of external heat was removed but the temperature of the reaction mixture continued to rise at the rate of about 1° C. per minute until the reaction temperature reached about 61° C. The temperature of the reaction mixture remain substantially constant at about 61° C. for about 10 minutes. Then the reaction mixture began to fall and the reaction mixture was allowed to cool slowly to ambient temperature. The organic layer (about 104 parts by weight) was separated from the aqueous layer of the reaction mixture and the latter extracted with diethyl ether. This extract was dried, the solvent removed and about 30 parts by weight of liquid product obtained.

The extracted aqueous layer of the reaction mixture; i. e., the raffinate, was causticized with about 8 moles of sodium hydroxide (as a 40 per cent aqueous solution), cooled to room temperature and extracted with diethyl ether. The extract was dried, the solvent removed, and 184 parts by weight of amine obtained. Analysis of the amine indicated a nitrogen content of 9.50 per cent.

EXAMPLE 26

About 1 mole of ammonium chloride, about 2 moles of formaldehyde (as paraformaldehyde) and about 1 mole of water (as a depolymerizer of the formaldehyde polymer) were added to about 1 mole of allyl alcohol,

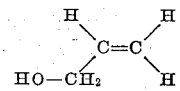

The reaction mixture was agitated and heated to about 65° C. The heat of reaction raised the reaction temperature to about 85° C. The temperature of the reaction mixture was held at about 80°–85° C. (by external heat) for about 2 hours. The reaction mixture was then cooled and about 198 parts by weight of ethanol were added. About 0.3 mole of ammonium chloride was removed.

The reaction mixture was evaporated to dryness and the residue treated with about 1 mole of sodium hydroxide and about 60 parts by weight of water. About 25 parts by weight of water were added and the resultant mixture extracted with diethyl ether. After removing the solvent about 6 parts by weight of light-red amine were obtained. The nitrogen content of this product was 15.72 per cent.

EXAMPLE 27

About 0.5 mole of ethylenediamine dihydrochloride was added to a mixture of about 1 mole of styrene and about 2 moles of formaldehyde (as a 35 per cent aqueous solution). The mixture was heated to about 70° C. and the source of external heat removed. Thereafter, the temperature rose to about 76° C. Thereupon the reaction mixture was subjected to external cooling but the temperature rose to about 77° C. and then began to fall. The source of external cooling then was removed and the temperature continued to fall. When the temperature reached 65° C. heat was supplied to the reaction mixture and the temperature maintained at about 65°–70° C. for about thirty minutes. Thereafter, the reaction mixture was allowed to cool to ambient temperature (15°–20° C.) and the reaction mixture extracted with diethyl ether. The extract was separated and dried.

The extracted reaction mixture was treated with about 1.1 moles of sodium hydroxide (as a 40 per cent aqueous solution) and cooled to ambient temperature. The causticized reaction mixture was extracted with diethyl ether and the extract dried. The solvent was removed from the dried extract to yield a dark-red, viscous liquid which began to crystallize. After standing about four hours the crystalline product was separated. A portion of the crystalline product was recrystallized from 95 per cent ethanol. The recrystallized product was analyzed and found to contain 75.17 per cent carbon; 8.16 per cent hydrogen and 8.10 per cent nitrogen. The melting point of the recrystallized product was 140.9°–141.9° C. (corr.).

The calculated values for carbon, hydrogen and nitrogen for a compound having a composition corresponding to $C_{22}H_{28}N_2O_2$ are compared with the values observed for the recrystallized material in the following tabulation:

|  | Percent Carbon | Percent Hydrogen | Percent Nitrogen |
| --- | --- | --- | --- |
| Calculated for $C_{22}H_{28}N_2O_2$ | 75.00 | 7.95 | 7.95 |
| Found | 75.17 | 8.16 | 8.10 |

Therefore, it would appear that the white crystalline material has a composition expressed by the formula:

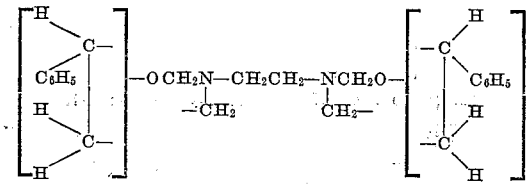

A small amount of ether-insoluble material was recovered from the causticized reaction material by filtration. This material was water-washed, dried and found to contain 8.99 per cent nitrogen.

EXAMPLE 28

About 1.2 moles of beta-pinene were added to a mixture of about 1 mole of ammonium chloride and about 2 moles of formaldehyde (as a 36 per cent aqueous solution). The reaction mixture was stirred and during a period of about 40 minutes the temperature of the reaction mixture rose slowly to about 68° C. The reaction mixture was allowed to cool slowly to room temperature and extracted with diethyl ether. The extract was dried and about 98 parts by weight of liquid obtained. About 87 parts by weight of this liquid were distilled. The log of this distillation is presented in the following tabulation:

| Fraction No. | Pot Temp., °C. | Vapor Temp., °C. | Pressure, mm. of Hg | $n_D^{20}$ | Parts By Weight |
| --- | --- | --- | --- | --- | --- |
| IBP | 98 | 35 | Atmos. |  |  |
| A | 171 | 108 | Atmos. | 1.4580 | 48 |
| 1 | 85 | 80 | 52 | 1.4722 | 5 |
| 2 | 94 | 85 | 52 | 1.4730 | 18 |
| 3 | 121 | 92 | 52 | 1.4752 | 7 |
| 4 | 140 | 89 | 52 | 1.4772 | 2 |
| 5 | 140 | 99 | 1.0 | 1.4818 | 5 |
| Residue |  |  |  |  | 2 |

$n_D^{20}$ for the beta-pinene charge stock was 1.4752; therefore, fractions 1 to 3 are essentially recovered beta-pinene.

The raffinate from the above extraction was treated with about 1 mole of sodium hydroxide (as a 40 per cent aqueous solution) and the causticized raffinate extracted with diethyl ether. The extract was dried over anhydrous calcium sulfate, the solvent removed and about 134 parts by weight of liquid were obtained. When heated under vacuum the last traces of solvent were removed from the product to leave a sticky, orange colored, semi-solid mass. The nitrogen content of this semi-solid mass was 7.13 per cent.

EXAMPLE 29

About 1 mole of ammonium chloride, about 2 moles of formaldehyde (as a 36 per cent aqueous solution) and about 5.5 moles of water were mixed and allowed to cool to room temperature. Whilst this mixture was stirred about 1 mole of beta-pinene was added slowly over a period of 30 minutes. The temperature of the reaction mixture began to rise slowly and, about 30 minutes after all of the beta-pinene had been added, reached about 40° C. The temperature of the reaction mixture was held at 40±2° C. by external cooling. After about 20 minutes the temperature of the reaction mixture began to fall. The reaction mixture was allowed to cool slowly to room temperature and extracted with diethyl ether. The extract was dried over anhydrous calcium sulfate, the solvent removed and about 74 parts by weight of organic material obtained.

The raffinate was cooled to about 10° C. and about 1 mole of sodium hydroxide (as a 40 per cent aqueous solution) was added slowly. During the addition of the caustic the temperature of the mixture was maintained at about 10°–20° C. The causticized raffinate was extracted with diethyl ether, the solvent removed and about 102 parts by weight of a light-orange liquid obtained. About 95 parts by weight of this liquid was subjected to a reduced pressure of about 30 mm. of mercury for about 30 minutes. After this treatment about 73 parts by weight of the material remained. This material had a nitrogen content of 6.90 per cent.

EXAMPLE 30

About 4 moles of formaldehyde (as a 35 per cent aqueous solution) and about 2 moles of ammonium chloride were mixed and about 1 mole of dipentene was added to the mixture. The resulting reaction mixture was heated slowly to about 75° C. and the temperature held between about 75° and about 80° C. for about 45 minutes. After cooling to room temperature about one-third of the reactant separated as an oily layer. The aqueous layer was causticized with about 5.5 moles of sodium hydroxide (as a 40 per cent aqueous solution) and the causticized reaction mixture extracted with diethyl ether. The extract was dried, the solvent removed and a viscous, liquid amine obtained. The viscous liquid amine had a nitrogen content of 10.91 per cent.

EXAMPLE 31

One mole each of aniline hydrochloride and styrene were mixed with about 350 parts by weight of water and cooled to about 10° C. The temperature of the mixture was held between about 10° and about 20° C. throughout the addition of about 2 moles of formaldehyde (as a 36 per cent aqueous solution). (About 30 minutes were required for the addition.) An orange precipitate formed. Agitation of the reaction mixture was continued for about two hours and the precipitate removed. The liquid reaction mixture was causticized with sodium hydroxide and a small amount of white resinous material recovered. After thorough elutriation with water and drying, this material was found to contain 8.01 per cent nitrogen.

The orange solid was dried and a portion boiled for three hours in about 15 times its weight of distilled water and an insoluble resin removed. After drying, the resin was found to contain 7.05 per cent nitrogen and 3.04 per cent chlorine.

The aqueous solution obtained by extracting the orange solid with boiling water was treated with caustic and the gummy material which separated was dissolved in boiling benzene. Evaporation of the benzene yields a light brown viscous oil having a nitrogen content of 10.94 per cent.

It is believed that the foregoing detailed discussion of the preparation of various amines by the application of the general principles of the present invention makes it unnecessary to provide any further detailed discussion of the preparation of other amines and formaldimines. It is believed sufficient to name the olefinic compound and indicate the formula of the resulting product.

The olefinic compounds can be reacted with formaldehyde, either as an aqueous solution or as a reversible polymer of formaldehyde in conjunction with a suitable depolymerizer, including water, and a hydrohalide of ammonia or a primary amine or diamine in the proportion of 1 mole of olefinic compound to at least one mole of formaldehyde and at least one mole of hydrohalide of ammonia or primary amine or diamine.

In further illustration of the generic concept of the present invention but not with the intention of limiting the scope of the present invention, the following examples are provided:

2-ethyl-2-butene can be reacted with aqueous 37 per cent formaldehyde solution and ammonium bromide at temperatures of about 0° to about 100° C., the reaction mixture treated as aforedescribed, and the following products obtained:

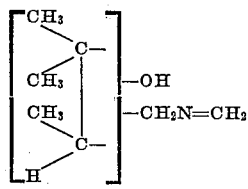

Hydroxy-2,3-dimethylbutylformaldimine

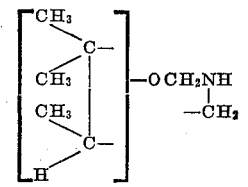

Trimethyl-tetrahydro-1,3-oxazine

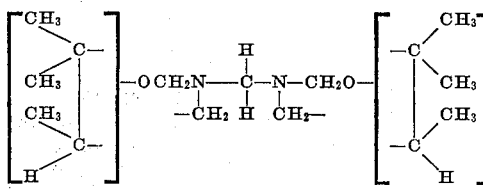

Bis-(trimethyl-tetrahydro-1,3-oxazino)-methane

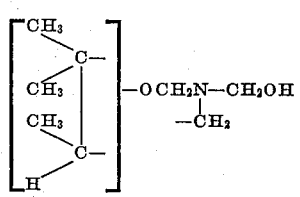

Trimethyl-N-methylol-tetrahydro-1,3-oxazine

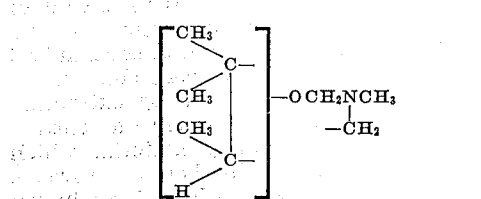

Trimethyl-N-methyl-tetrahydro-1,3-oxazine

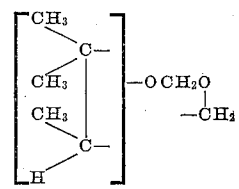

Trimethyl-m-dioxane as a by-product

Similarly, 2,3-dimethyl-1-butene can be reacted with aqueous 35 per cent formaldehyde solution and ethylamine hydrohalide, the reaction mixture causticized and the following compounds recovered:

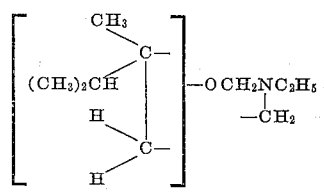

Methyl-isopropyl-N-ethyl-tetrahydro-1,3-oxazine

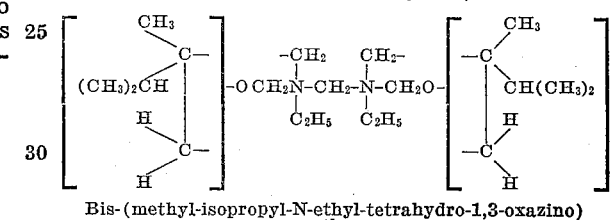

Bis-(methyl-isopropyl-N-ethyl-tetrahydro-1,3-oxazino) methane 2,3-dimethyl-1-pentene likewise can be reacted with ammonium bromide, paraformaldehyde and a depolymerizer such as acetic acid at temperatures of about 40° C. to about 140° C. When the acidic reaction mixture is extracted with a solvent the m-dioxane is obtained. When the extracted reaction mixture is causticized and extracted in a manner similar to that described in detail hereinbefore, the methyl - ( 1- methylpropyl) -tetrahydro-1,3-oxazine is obtained. It is to be noted that when the reaction is carried out at reflux temperatures, the N-methyl compound specifically is obtained. Consequently, (with this exception) corresponding products are obtained when 3-methyl-3-hexene is reacted with aqueous 37 per cent formaldehyde and ammonium halide.

When 2-methyl-1-heptene, formaldehyde and propylamine hydrohalide are reacted at temperatures of about 40° to about 150° C. the principal product obtained by extraction of the causticized reaction mixture is pentyl, methyl-N-propyl-tetrahydro-1,3-oxazine

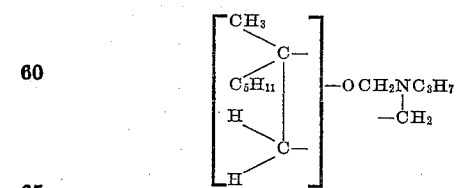

When 2,3-dimethyl-1-hexene is reacted with formaldehyde and benzylamine hydrohalide at about 40° C. to about 150° C. in a manner similar to that described more fully hereinbefore, the reaction mixture causticized, and extracted with a solvent such as diethyl ether, the principal product is methyl-(2'-pentyl)-N-benzyl-tetrahydro-1,3-oxazine.

In a similar manner, when 2,3,4-trimethyl-1-pentene is reacted with paraformaldehyde, water and butylamine hydrohalide the principal product is methyl-(2'-(3'-methyl)-butyl) N-butyl-tetrahydro-1,3-oxazine.

When 3-methyl-2-isopropyl-1-butene is reacted with aqueous 37 per cent formaldehyde solution and ammonium chloride in the molal proportion of 1:8:3 and the reaction mixture refluxed for three to six hours, and the reaction mixture causticized, the principal products are diisopropyl-N-methyl-tetrahydro-1,3-oxazine.

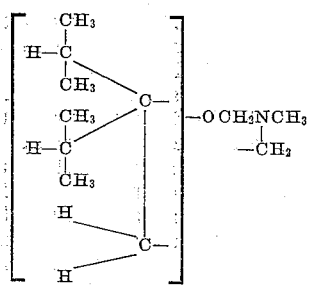

Diisopropyl-N-methyl-tetrahydro-1,3-oxazine and

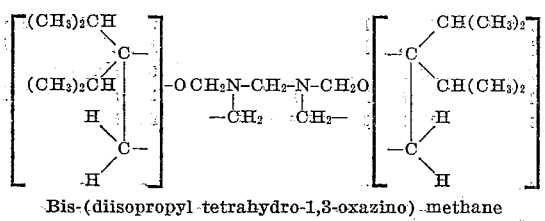

Bis-(diisopropyl tetrahydro-1,3-oxazino)-methane

When 2-methyl-2-undecene is reacted with aqueous 36 per cent formaldehyde solution and ammonium halide at temperatures of about 40° C. to about 150° C. the following products can be obtained (1) upon extraction of the acidic reaction mixture, dimethyl-octyl-m-dioxane, (2) upon extraction of the causticized raffinate from the acidic extraction, hydroxy-methyl-n-octyl-formaldimine, dimethyl - actyltetrahydro - 1,3-oxazine and bis-(dimethyl-octyltetrahydro-1,3-oxazino)-methane.

When 2-methyl-2-heptadecene, paraformaldehyde, acetic acid and methylamine hydrohalide are reacted in a manner similar to that described hereinbefore, the principal product of the extraction of the causticized reaction mixture is dimethyl - tetradecyl - N-methyl-tetrahydro-1,3-oxazine.

When Δ9,11-linoleic acid is reacted with paraformaldehyde, acetic acid and methylamine hydrohalide in the manner described hereinbefore the principal product obtained upon extraction of the causticized reaction mixture is an oxazino derivative of the linoleic acid.

An analogous product is obtained by extraction of the causticized reaction mixture obtained by reacting linolenic acid, paraformaldehyde, acetic acid and methylamine hydrohalide.

Results similar in every respect are obtained when aromatic compounds having olefinic side chains are treated in the manner described hereinbefore. For example, 1-phenyl-1-butene when reacted with an excess of formaldehyde in the form of a 37 per cent aqueous solution and ammonium halide yields as the principal products phenyl-ethyl-tetrahydro-1,3-oxazine and bis-(phenyl-ethyl-tetrahydro-1,3-oxazine)-methane.

Under the conditions described hereinbefore 2-phenyl-4-methyl-2-hexene when reacted with formaldehyde and secondary butylamine as the hydrohalide yields as the principal product methyl-phenyl-secondary butyl-N-butyl-tetrahydro-1,3-oxazine.

A similar reaction takes place with the cycloparaffins having an unsaturated side chain. For example, 2-cyclopropyl-1-propene reacts with aqueous 37 per cent formaldehyde solution and methylamine hydrohalide to yield, upon extraction of the causticized reaction mixture, cyclopropyl-methyl-N-methyl-tetrahydro-1,3-oxazine.

Similarly the reaction between 1-isopropenyl-2-methyl-3-cyclohexene (o-menthadiene), paraformaldehyde, a depolymerizer, and butylamine hydrohalide yields, upon extraction of the causticized reaction mixture, (2'-methyl-3'-cyclohexenyl) - methyl - N - butyl - tetrahydro - 1,3-oxazine.

Another illustration of the general concept is the reaction between 1-methyl-4-isopropenyl-1-cyclohexene (di-pentene, limonene), paraformaldehyde, a depolymerizer and aniline hydrochloride which yields, upon extraction of the causticized reaction mixture, (4'-methyl-3'-cyclohexenyl) - methyl - N - phenyl - tetrahydro - 1,3-oxazine.

Stilbene (1,2-diphenylethylene) reacts with aqueous 37 per cent formaldehyde solution and benzylamine hydrohalide to yield, upon causticization of the reaction mixture and extraction thereof, diphenyl-N-benzyl-tetrahydro-1,3-oxazine.

Vinylphenol reacts with aqueous 37 per cent formaldehyde and propylamine hydrochloride to yield, upon extraction of the causticized reaction mixture, (hydroxyphenyl)-N-propyl-tetrahydro-1,3-oxazine.

3-vinylguaiacol reacts with aqueous 37 per cent formaldehyde solution and amylamine hydrochloride to yield, upon extraction of the causticized reaction mixture, (1'-hydroxy-2'-methoxyphenyl)-N-amyl-tetrahydro-1,3-oxazine.

Vinylacrylic acid $CH_2=CH-CH=CHCOOH$ when reacted with aqueous 38 per cent formaldehyde and ammonium halide yields, upon extraction of the causticized reaction mixture, the alkaline salt of an oxazino derivative of vinyl acrylic acid.

In a similar manner

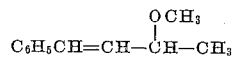

when reacted with paraformaldehyde, a depolymerizer and an ammonium halide, for example the chloride, yields, upon extraction of the causticized reaction mixture, phenyl-(1-methoxyethyl)-tetrahydro-1,3-oxazine and the corresponding di-oxazino-methane.

In a manner analogous to that described hereinbefore propenylguaiacol can be reacted with paraformaldehyde, a depolymerizer and methylamine hydrochloride to yield, upon extraction of the causticized reaction mixture, (1'-hydroxy-2'-methoxyphenyl)-methyl-N - methyl - tetrahydro-1,3-oxazine.

The heterocyclic compounds having unsaturated side chains also can participate in this reaction. Thus, for example, when 2-vinylthiophene reacts with aqueous 37 per cent formaldehyde and ethylamine hydrochloride, extraction of the causticized reaction mixture yields (2'-thienyl)-N-ethyl-tetrahydro-1,3-oxazine.

Similarly, 2-methyl-4-vinylthiophene when reacted with aqueous 37 per cent formaldehyde and an amylamine hydrohalide yields, upon extraction of the causticized reaction mixture (2'- methyl - 4' - thienyl) - N - amyl-tetrahydro-1,3-oxazine.

1-furyl-1-butene when reacted with 37 per cent aqueous formaldehyde solution and methylamine hydrohalide at temperatures of 40° C. to about 150° C. yields, upon extraction of the causticized reaction mixture furyl-ethyl-N-methyl-tetrahydro-1,3-oxazine.

Similarly, when vinylpyridine reacts with aqueous 37 per cent formaldehyde solution and methylamine hydrohalide at temperatures of about 0° C. to about 80° C. the causticized reaction mixture, upon extraction, yield pyridyl-N-methyl-tetrahydro-1,3-oxazine.

In an analogous manner 1-pyrryl-1-propene reacts with aqueous 37 per cent formaldehyde solution and methylamine hydrochloride to yield, upon extraction of the causticized reaction mixture, pyrryl-methyl-N-methyl-tetrahydro-1,3-oxazine.

It will be recognized by those skilled in the art that the foregoing olefinic compounds all conform to the generic formula

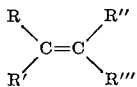

wherein R, R', R'' and R''' are hydrogen or an alkyl group, an aryl group, an alkaryl group, an aralkyl group or a heterocyclic group as defined hereinbefore. These and other olefinic compounds of similar structure can be reacted with a hydrohalide of ammonia or a primary amine conforming to the formula $NH_2Y(HX)$, wherein Y is hydrogen or an alkyl group of not more than six carbon atoms or an aryl group or an hydroxyl group and X is chlorine, bromine or iodine or the hydrohalide of a primary diamine $HN_2(CH_2)_mNH_2(HX)_2$, wherein $m$ is an integer 2 to 8, to form upon causticizing the reaction mixture, when an ammonium halide is used, gamma-hydroxyalkyl-formaldimines

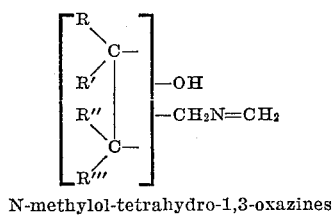

N-methylol-tetrahydro-1,3-oxazines

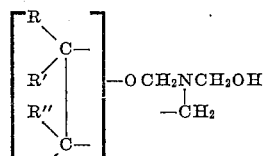

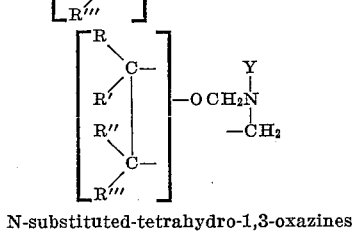

N-substituted-tetrahydro-1,3-oxazines

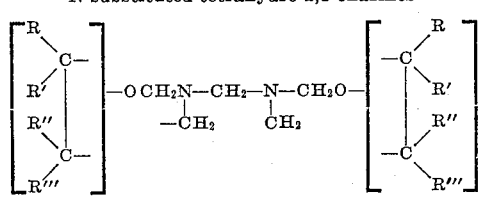

When a primary amine hydrohalide or hydroxylamine hydrohalide are substituted for the ammonium halide the formaldimines are not formed nor are the bis-oxazine-methanes, and the N-substituted-tetrahydro-1,3-oxazines are the principal product recovered by extracting the causticized reaction mixture. When either ammonium halide or primary amine hydrohalide is used, extraction of the acidic reaction mixture yields substituted m-dioxanes.

While the foregoing discussion has been limited to the reaction between olefinic hydrocarbons and carboxylic acids on the one hand and formaldehyde and hydrohalides of ammonia and primary amines and primary diamines on the other, it is to be understood that substituted olefins in which the substituent groups are also substituted by inorganic substituents such as sulfur and/or oxygen, the halides and, in general, electron withdrawing substituents with the exception of $NO_2$ can participate in this reaction. Electron withdrawing substituents are defined as those substituents which cause meta substitution in the benzene nucleus. In other words, any compound in which a substituent activates the olefinic bond can be employed. Vinyl sulfone for example can be used. The halogenated vinyl sulfones such as alpha-chlorovinyl-beta-chloroethyl sulfone and the aryl and alkyl vinyl sulfones corresponding to the formula,

($R^V$ is any group selected from the class of alkyl, aryl, or aralkyl, alkaryl, or cycloalkyl) can participate in the present reaction. Thus, for example, when benzyl-propenyl sulfone,

reacts with paraformaldehyde, a depolymerizer and ammonium chloride, the product of the extraction of the causticized reaction mixture is methyl - benzyl - sulfonyl - N - methyl-tetrahydro-1,3-oxazine. Vinyl ethers

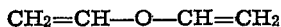

and homologues thereof likewise participate in this reaction.

Dimethylallyl ether,

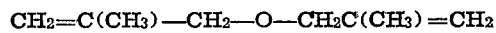

when reacted with 38 per cent aqueous formaldehyde resolution and methylamine hydrochloride yields, upon extraction of the causticized reaction mixture, the following product:

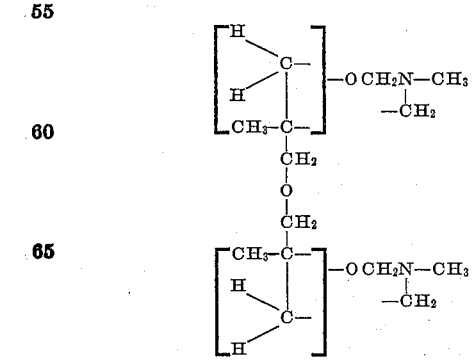

In a similar manner the vinyl thioethers participate in this reaction. Thus, vinyl thioether, $CH_2=CH-S-CH=CH_2$, when reacted with aqueous 38 per cent formaldehyde solution and methylamine hydrochloride and the reaction mixture causticized yields the following compound.

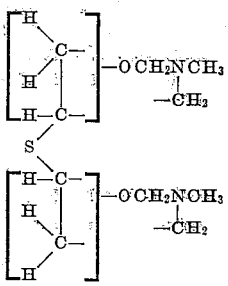

Other compounds of this general type such as the vinyl halides, $CH_2=CHCl$, $CH_2=CH-CH_2Br$, $(CH_3)_2C=CHBr$ and the like participate in this reaction. For example, allyl bromide, $$CH_2=CH-CH_2Br$$

reacts with paraformaldehyde (acetic acid as the depolymerizer) and methylamine hydrochloride to yield bromomethyl-tetrahydro-1,3-oxazine.

From the foregoing discussion of the present method for making gamma-hydroxy-alkyl-formaldimines, substituted 1,3-dioxanes, substituted tetrahydro-1,3-oxazines, N-methyloltetrahydro-1,3-oxazines, N-methyl-tetrahydro-1,3-oxazines, bis-(tetrahydro-1,3-oxazino)-alkanes and the corresponding amines in which an alkyl group from the reacting amine hydrohalide is attached to the nitrogen atom of the aforesaid amines, it will be recognized by those skilled in the art that the present invention provides a method for the production of the aforesaid types of compounds by reacting an olefinic compound having a composition corresponding to the formula

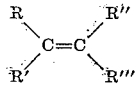

and ammonium halide or substituted ammonium halide, corresponding to the formula $NH_2Y \cdot HX$ or $NH_2(CH_2)_mNH_2(HX)_2$ with formaldehyde and a reversible polymer of formaldehyde and a depolymerizer at temperatures of about 0° to about 80° C., and recovering the products of the reaction. In the foregoing, R, R', R'', R''' and Y have the following values: R, R', R'' and R''' may be hydrogen, an alkyl group having not more than 16 carbon atoms, an aryl group, an alkaryl group in which the alkyl substituent has not more than 8 carbon atoms, an aralkyl group in which the alkyl portion has not more than 8 carbon atoms, a cycloalkyl group or a heterocyclic group. The substituents R, R', R'' and R''' in any compounds may all be the same or may be different. Furthermore, while R, R', R'' and R''' may all be substituent groups, it is desirable that not more than three of R, R', R'' and R''' be other than hydrogen and it is preferred that only two of R, R', R'' and R''' be other than hydrogen. Furthermore, when only one of R, R', R'' and R''' is a substituent other than hydrogen, it is preferred and, in fact, essential that that substituent be one having a double bond conjugated with the double bond of the olefinic parent compound. Compounds of the general formula

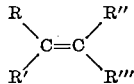

in which one or all of R, R', R'' and R''' are further substituted by groups other than —$NO_2$, such as the halides, sulfur, oxygen, carboxyl, etc. can also be used. Y may be hydrogen as in the hydrohalide of ammonia (ammonium halide), or an alkyl, aryl, alkaryl, aralkyl or cycloalkyl group as in the hydrohalides of the primary amines or hydroxyl as in hydroxylamine hydrohalide. Formaldehyde as such, as an aqueous solution or as a reversible polymer can be used. However, when a reversible polymer is used, it is desirable that a depolymerizer also be present. Such depolymerizers are well-known to those skilled in the art and include water and acids having an ionization constant greater than $1 \times 10^{-5}$.

As has been pointed out before, the amine products obtained by the reactions discussed hereinbefore have use as emulsifiers as is illustrated by the following results.

An amine oleate was prepared by mixing in benzene equimolar amounts of oleic acid and the crude amine product obtained by the reaction of isobutylene as described hereinbefore and removing the benzene by evaporation. This oleate was employed as an emulsifier in blends of water with a white mineral oil having a kinematic viscosity at 100° F. of 12.56 centistokes. All mixtures were blended for five minutes in a "Waring blender."

| Mixture Number | Percent $H_2O$ | Percent Oil | Percent Amine Oleate |
|---|---|---|---|
| 1 | 50.00 | 49.50 | 0.50 |
| 2 | 50.00 | 49.95 | 0.05 |
| 3 | 50.00 | 49.90 | 0.10 |

All of the mixtures formed emulsions. In each instance there was a partial separation of the water and oil after 24 hours but "hand-mixing" was sufficient to restore the emulsion. After storage for approximately four months, there was a partial separation of mixture Number 1 but "hand-mixing" was sufficient to restore the emulsion. Mixture Number 2 had separated and "hand-mixing" would not restore the emulsion. Mixture Number 3 had separated and only partial emulsification took place with "hand-mixing."

Two more emulsions were prepared: Mixture Number 4 contained 4.5 parts by weight of oleic acid, 1.5 parts by weight of triethanolamine, 40 parts by weight of the aforedescribed white mineral oil and 54 parts by weight of water. Mixture Number 5 contained 4.5 parts by weight of oleic acid, 1.5 parts by weight of the crude amine product from isobutylene, 40 parts by weight of the aforedescribed white mineral oil and 54 parts by weight of water.

Both mixtures were blended for five minutes in a "Waring blender." After storage for about four months both mixtures had partially separated but "hand-mixing" was sufficient to restore the emulsion in both mixtures.

We claim:
1. A method for preparing condensation products which comprises mixing (1) an olefinic compound, (2) formaldehyde and (3) a hydrohalide selected from the group consisting of hydrohalides of ammonia, primary amines, hydroxylamine and primary diamines having not more than 6 carbon atoms, holding the mixture so formed at about 0° to about 150° C., and recovering the products of the reaction.

2. A method for preparing condensation products which comprises mixing (1) an olefinic compound having not more than two hydrogen atoms attached to the carbon atoms of the olefinic moiety, (2) formaldehyde and (3) a hydrohalide selected from the group consisting of hydrohalides of ammonia, primary amines, hydroxylamine and primary diamines having not more than 6 carbon atoms, holding the mixture so formed at about 0° to about 150° C., and recovering the products of the reaction.

3. A method for preparing condensation products which comprises mixing (1) an olefinic compound having three hydrogen atoms attached to the carbon atoms of an olefinic moiety and the fourth valence of the aforesaid olefinic moiety satisfied by a substituent having a carbon to carbon double bond conjugated with the double bond of the aforesaid olefinic moiety, (2) formaldehyde and (3) a hydrohalide selected from the group consisting of hydrohalides of ammonia, primary amines, hydroxylamine and primary diamines having not more than 6 carbon atoms, holding the mixture so formed at about 0° to about 150° C., and recovering the products of the reaction.

4. A method for preparing substituted tetrahydro-1,3-oxazines which comprises mixing (1) an olefinic compound, (2) formaldehyde and (3) ammonium halide, holding the mixture so formed at about 0° to about 150° C. to obtain a reaction mixture containing a substituted tetrahydro-1,3-oxazine, causticizing said reaction mixture, extracting said causticized reaction mixture with a solvent for said substituted tetrahydro-1,3-oxazine, separating said extract, and recovering said substituted tetrahydro-1,3-oxazine.

5. The method described and set forth in claim 4 wherein the ammonium halide is a hydrohalide of a primary amine.

6. The method described and set forth in claim 4 wherein the ammonium halide is a hydrohalide of hydroxylamine.

7. The method described and set forth in claim 4 wherein the reaction mixture before causticization is extracted with a solvent for m-dioxanes.

8. The method described and set forth in claim 4 wherein the olefinic compound is one in which at least one valence of the carbon atoms of an olefinic moiety is satisfied by a substituent having a carbon to carbon double bond conjugated with the double bond of the aforesaid olefinic moiety and the reaction mixture before causticization is extracted with a solvent for m-dioxanes.

9. A method for preparing gamma-hydroxyalkylformaldimines which comprises mixing (1) an olefinic compound, (2) formaldehyde and (3) ammonium halide in the molal proportion of 1:2:1, holding the mixture so formed at about 0° to about 100° C., extracting the mixture containing gamma-hydroxyalkylformaldimines with a solvent for m-dioxanes, causticizing the extracted reaction mixture, extracting the causticized reaction mixture with a solvent for the aforesaid gamma-hydroxyalkylformaldimine, and recovering said gamma-hydroxyalkylformaldimine.

10. A method for preparing bis (tetrahydro-1,3-oxazino) alkanes which comprises mixing (1) an olefinic compound having not more than 2 hydrogen atoms attached to the carbon atoms of an olefinic moiety of said olefinic compound, (2) formaldehyde and (3) a hydrohalide selected from the group consisting of hydrohalides of ammonia, primary amine and primary diamine having not more than 6 carbon atoms, holding the mixture so formed at about 0° to about 100° C., to obtain reaction mixture containing bis (tetrahydro-1,3-oxazino) alkane and recovering the bis (tetrahydro 1,3-oxazino) alkane.

11. Bis-(tetrahydro-1,3-oxazino)-alkanes having the structural formula

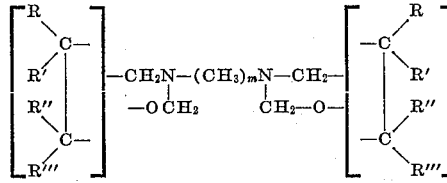

wherein R, R', R'', R''' are selected from the group consisting of hydrogen atoms, alkyl radicals having not more than 16 carbon atoms, hydroxyalkyl radicals, carboxyalkyl radicals, oxoalkyl radicals, alkaryl radicals having not more than 8 carbon atoms in the alkyl group thereof, alkenylaryl radicals having not more than 8 carbon atoms in the alkenyl group thereof, thienyl radicals, furyl radicals, and pyridyl radicals, and $m$ is an integer of 1 to 6.

12. Bis - (phenyl - tetrahydro - 1,3 - oxazino) - methane having the empirical formula, $$C_{21}H_{26}N_2O_2,$$

and melting at 126.5° C. to 127° C.

13. Bis - (phenyl - methyl tetrahydro - 1,3 - oxazino)-methane having the empirical formula, $C_{23}H_{34}N_2O_2$, and melting at 113° C. to 114° C.

14. Bis - (phenyl - tetrahydro - 1,3 - oxazino) - ethane having the empirical formula, $C_{22}H_{28}N_2O_2$, and melting at 140.9° C. to 141.9° C.

HOWARD D. HARTOUGH.
JOSEPH J. DICKERT, JR.
SEYMOUR L. MEISEL.

References Cited in the file of this patent

UNITED STATES PATENTS

| Number | Name | Date |
|---|---|---|
| 1,726,713 | North et al. | Sept. 3, 1929 |
| 2,114,121 | Bender | Apr. 12, 1938 |
| 2,243,295 | Susie et al. | May 27, 1941 |
| 2,287,464 | Bock | June 23, 1942 |
| 2,312,414 | Jayne et al. | Mar. 2, 1943 |
| 2,319,848 | Clark et al. | May 25, 1943 |
| 2,447,822 | Senkus | Aug. 24, 1948 |
| 2,453,086 | Caesar | Nov. 2, 1948 |
| 2,458,526 | Oberright | Jan. 11, 1949 |
| 2,476,559 | Nawiasky | July 19, 1949 |
| 2,490,392 | Whetstone et al. | Dec. 6, 1949 |
| 2,533,798 | Hartough et al. | Dec. 12, 1950 |
| 2,559,567 | Hartough et al. | July 3, 1951 |

OTHER REFERENCES

Mannich et al.: Chem. Abst., vol 31, pp. 2215 and 2216.

Kohn: Monatshefte, vol. 25 (1904), p. 820 (complete article pp. 817–849).

Kohn: Monatshefte, vol. 25 (1904) pp. 857, 859, 863 (complete article 850–864).

Betti: Gazetta Chem. Ital., vol. 31 (1901) pp. 377, 382 and 383 (complete article, pp. 377–393).

Adams: Organic Reactions, vol. 1 (1942, Wiley and Sons, N. Y.), pp. 314 and 315.